(12) United States Patent
Joseph et al.

(10) Patent No.: US 10,659,523 B1
(45) Date of Patent: May 19, 2020

(54) ISOLATING COMPUTE CLUSTERS CREATED FOR A CUSTOMER

(71) Applicant: Amazon Technologies, Inc., Reno, NV (US)

(72) Inventors: Rejith George Joseph, Seattle, WA (US); Tin-Yu Lee, Seattle, WA (US); Scott Michael Le Grand, Soquel, CA (US); Saurabh Dileep Baji, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 315 days.

(21) Appl. No.: 14/286,724

(22) Filed: May 23, 2014

(51) Int. Cl.
  *G06F 15/16* (2006.01)
  *H04L 29/08* (2006.01)
(52) U.S. Cl.
  CPC .................. *H04L 67/10* (2013.01)
(58) Field of Classification Search
  CPC .... H04L 67/10; H04L 67/1036; H04L 67/107
  USPC ......................................................... 709/201
  See application file for complete search history.

(56) References Cited

U.S. PATENT DOCUMENTS

| | | | | |
|---|---|---|---|---|
| 7,466,810 B1 * | 12/2008 | Quon | ................ | H04M 3/42229 379/201.01 |
| 7,487,228 B1 * | 2/2009 | Preslan | ............. | G06F 17/30067 709/218 |
| 7,685,388 B1 * | 3/2010 | Jiang | ................... | G06F 11/1451 711/111 |
| 7,822,841 B2 * | 10/2010 | Franklin | ............... | H04L 41/044 705/6 |
| 7,886,021 B2 * | 2/2011 | Scheifler | ................. | G06F 9/485 709/217 |
| 8,103,772 B2 * | 1/2012 | Schreter | ............ | H04L 29/12292 709/223 |

(Continued)

FOREIGN PATENT DOCUMENTS

CN  102255903 B  *  7/2014

OTHER PUBLICATIONS

B. Ghit, N. Yigitbasi, and D. Epema, "Resource management for dynamic mapreduce clusters in multicluster systems," in High Performance Computing, Networking, Storage and Analysis (SCC), 2012, SC Companion:, pp. 1252-1259, IEEE, 2012.

*Primary Examiner* — John B Walsh
(74) *Attorney, Agent, or Firm* — Robert C. Kowert; Kowert, Hood, Munyon, Rankin & Goetzel, P.C.

(57) ABSTRACT

At the request of a customer, a distributed computing service provider may create multiple clusters under a single customer account, and may isolate them from each other. For example, various isolation mechanisms (or combinations of isolation mechanisms) may be applied when creating the clusters to isolate a given cluster of compute nodes from network traffic from compute nodes of other clusters (e.g., by creating the clusters in different VPCs); to restrict access to data, metadata, or resources that are within the given cluster of compute nodes or that are associated with the given cluster of compute nodes by compute nodes of other clusters in the distributed computing system (e.g., using an instance metadata tag and/or a storage system prefix); and/or restricting access to application programming interfaces of the distributed computing service by the given cluster of compute nodes (e.g., using an identity and access manager).

20 Claims, 16 Drawing Sheets

(56) References Cited

U.S. PATENT DOCUMENTS

| | | | | |
|---|---|---|---|---|
| 8,108,855 B2* | 1/2012 | Dias | G06F 9/5077 | 709/203 |
| 8,375,227 B2* | 2/2013 | Terek | G06F 3/0608 | 711/113 |
| 8,539,078 B2* | 9/2013 | Duan | G06F 9/5061 | 709/220 |
| 8,554,917 B2* | 10/2013 | Agarwala | G06F 9/5072 | 709/226 |
| 8,600,998 B1* | 12/2013 | Chaudhary | G06F 17/30082 | 707/741 |
| 8,695,079 B1* | 4/2014 | Miller | H04L 63/08 | 709/223 |
| 8,725,798 B2* | 5/2014 | Alam | G06F 9/5072 | 709/203 |
| 8,769,644 B1* | 7/2014 | Eicken | H04L 67/1097 | 709/225 |
| 8,775,282 B1* | 7/2014 | Ward, Jr. | H04L 41/0896 | 705/34 |
| 8,832,234 B1* | 9/2014 | Brooker | G06F 17/30194 | 709/219 |
| 9,031,925 B2* | 5/2015 | Gardella | G06F 17/30575 | 707/705 |
| 9,172,750 B2* | 10/2015 | Bulkowski | G06F 17/30575 | |
| 9,525,643 B2* | 12/2016 | Teather | H04L 47/70 | |
| 2002/0184407 A1* | 12/2002 | Shell | H04L 67/00 | 719/328 |
| 2003/0028504 A1* | 2/2003 | Burgoon | G06K 9/6217 | |
| 2003/0037251 A1* | 2/2003 | Frieder | G06F 21/552 | 726/23 |
| 2005/0021755 A1* | 1/2005 | Hipp | G06F 9/4843 | 709/225 |
| 2005/0138419 A1* | 6/2005 | Gupta | G06F 21/6218 | 726/4 |
| 2006/0031230 A1* | 2/2006 | Kumar | G06F 17/30194 | |
| 2006/0075278 A1 | 4/2006 | Kallahalla et al. | | |
| 2006/0230149 A1* | 10/2006 | Jackson | G06F 9/5027 | 709/226 |
| 2006/0277184 A1* | 12/2006 | Faitelson | G06F 21/316 | |
| 2007/0011199 A1 | 1/2007 | Hunt et al. | | |
| 2007/0276838 A1* | 11/2007 | Abushanab | G06F 17/30067 | |
| 2008/0133486 A1* | 6/2008 | Fitzgerald | G06F 9/5077 | |
| 2009/0037572 A1* | 2/2009 | Gebhart | G06F 9/455 | 709/224 |
| 2009/0089406 A1 | 4/2009 | Roush et al. | | |
| 2009/0276771 A1* | 11/2009 | Nickolov | G06F 9/4856 | 717/177 |
| 2009/0327798 A1* | 12/2009 | D'Amato | G06F 3/062 | 714/4.1 |
| 2010/0017460 A1* | 1/2010 | Shen | G06F 9/505 | 709/203 |
| 2011/0023104 A1 | 1/2011 | Franklin | | |
| 2012/0047265 A1* | 2/2012 | Agarwala | G06F 9/5072 | 709/226 |
| 2012/0110055 A1* | 5/2012 | Van Biljon | G06Q 30/04 | 709/201 |
| 2012/0185913 A1 | 7/2012 | Martinez et al. | | |
| 2012/0215920 A1* | 8/2012 | Doyle | G06F 9/5066 | 709/226 |
| 2012/0331144 A1* | 12/2012 | Supalov | G06F 9/5072 | 709/226 |
| 2013/0152078 A1 | 6/2013 | Arcilla et al. | | |
| 2013/0188512 A1* | 7/2013 | Norris | H04L 12/4641 | 370/254 |
| 2013/0204849 A1* | 8/2013 | Chacko | G06F 3/0604 | 707/692 |
| 2013/0227558 A1* | 8/2013 | Du | G06F 9/45558 | 718/1 |
| 2013/0238785 A1* | 9/2013 | Hawk | G06F 9/5072 | 709/224 |
| 2013/0290249 A1* | 10/2013 | Merriman | G06F 17/30578 | 707/610 |
| 2013/0318297 A1* | 11/2013 | Jibbe | G06F 3/061 | 711/114 |
| 2013/0326216 A1 | 12/2013 | Zimmer et al. | | |
| 2014/0032595 A1* | 1/2014 | Makkar | G06F 17/30557 | 707/770 |
| 2014/0068746 A1* | 3/2014 | Gonzalez Martinez | H04L 63/0884 | 726/9 |
| 2014/0075029 A1* | 3/2014 | Lipchuk | G06F 9/505 | 709/226 |
| 2014/0082749 A1 | 3/2014 | Holland et al. | | |
| 2014/0108474 A1* | 4/2014 | David | G06F 17/30 | 707/827 |
| 2014/0123136 A1* | 5/2014 | Beda, III | G06F 9/45558 | 718/1 |
| 2014/0207861 A1* | 7/2014 | Brandwine | H04L 51/32 | 709/204 |
| 2015/0058843 A1* | 2/2015 | Holler | G06F 9/455 | 718/1 |

\* cited by examiner

ISOLATING COMPUTE CLUSTERS CREATED FOR A CUSTOMER

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. Examples of such large-scale systems include online merchants, internet service providers, online businesses such as photo processing services, corporate networks, cloud computing services (including high-performance computing services for executing large and/or complex computations), web-based hosting services, etc. These entities may maintain computing resources in the form of large numbers of computing devices (e.g., thousands of hosts) which are hosted in geographically separate locations and which are configured to process large quantities (e.g., millions) of transactions daily or even hourly.

The advent of virtualization technologies for commodity hardware has provided benefits with respect to managing large-scale computing resources for many customers with diverse service needs, allowing various computing resources and services to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

One conventional approach for harnessing these resources to process data is the MapReduce model for distributed, parallel computing. In a MapReduce system, a large data set may be split into smaller chunks, and the smaller chunks may be distributed to multiple computing nodes in a cluster for the initial "map" stage of processing. Multiple nodes may also carry out a second "reduce" stage of processing based on the results of the map stage. Other approaches often applied in distributed, parallel computing rely on message passing between pairs of computing nodes in a cluster. For example, MPI is a portable (i.e. language-independent) communications protocol and message passing interface standard (API) that is sometimes employed in parallel programming to facilitate coordination between the computing nodes that collectively execute a parallel application. In various cluster-based distributed computing systems, data to be accessed by compute nodes in a cluster may be stored within the virtualized resources instances of the cluster and/or in data storage systems that are separate from the virtualized resource instances of the cluster.

Figure 1:
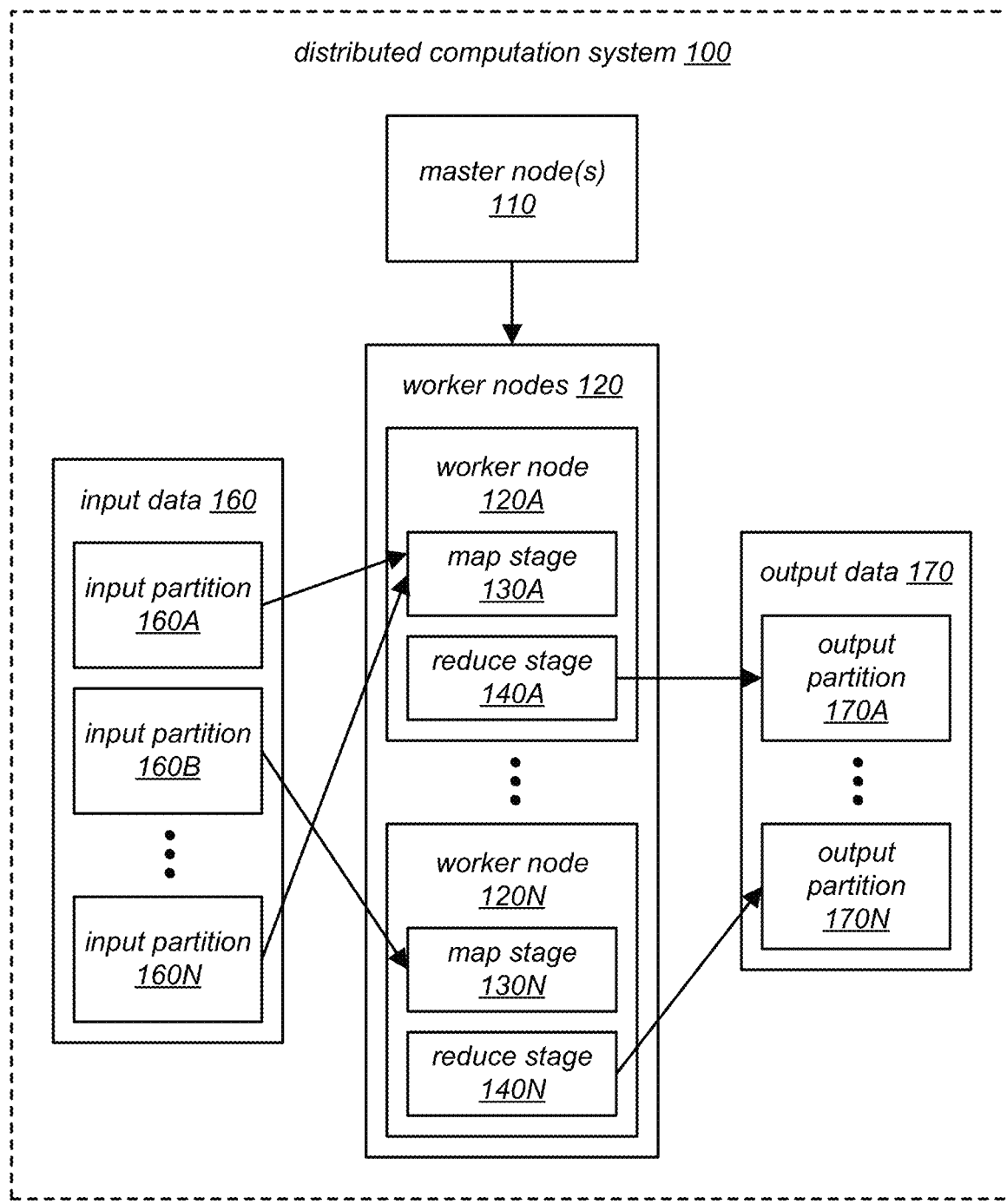
FIG. 1 illustrates an example system environment for performing a MapReduce job, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Various embodiments of methods and apparatus for isolating clusters of computing nodes that are created for the same customer or under the same customer account from each other on a distributed computing system are described. Typically, a cluster-based distributed computing system (e.g., the Apache™ Hadoop® framework) does not support the isolation of clusters that are created under the same customer account from each other. However, some customer accounts may represent customers who are themselves third party service providers for their own customers, or they may represent other collections of users who access the services provided by a distributed computing system under a single customer account but whose data and resources should (for security and/or for any number of other reasons) be isolated from each other. For example, a single customer account may represent a large organization that includes multiple clients (e.g., multiple client applications or end users) that access the service provider using the same customer account to obtain distributed computing services.

In some embodiments, in order to support these and other use cases, a distributed computing service provider may create multiple clusters of compute nodes (e.g., clusters that comprise a collection of virtualized computing and storage resources instances) under a single customer account, and may isolate them from each other. For example, the service may apply one or more isolation mechanisms (or combinations of isolation mechanisms) when creating each of the clusters to isolate them in terms of network isolation, data isolation (which may include isolation of storage resources that store data and/or metadata for the use of the clusters and/or the applications that execute on them) and/or instance (process) isolation, in different embodiments. These isolation techniques may be applied automatically (e.g., programmatically) by the service or may be performed in response to a request from a client (e.g., a client application, through which an end user, service subscriber, or third party service that is a customer of the service interacts with the service) to create a secure, isolated cluster under a particular customer account (e.g., using service provider resources that are allocated to that customer account).

In some embodiments, a given cluster of compute nodes that has been created while implementing one or more of the isolation mechanisms described herein may be isolated from other clusters (including those created under the same customer account) in one or more ways. As described in more detail below, the isolation mechanisms may isolate the given cluster of compute nodes from any network traffic from compute nodes of other clusters, (e.g., by creating the given cluster and each other cluster in different VPCs); may restrict access to data, metadata, or resources that are within the given cluster of compute nodes or that are associated with the given cluster of compute nodes (e.g., storage volumes that are attached by one or more resource instances of the given cluster) by compute nodes of other clusters of in the distributed computing system (e.g., using an instance metadata tag and/or a storage system prefix); and/or may restrict access to application programming interfaces of the distributed computing service by the given cluster of compute nodes (e.g., using an identify and access manager).

In general, in the distributed computing systems described herein, one or more compute nodes may access portions of a data set from data storage, process the data, and output the processed data to data storage (which may be, but is not necessarily, the same data storage from which the data set was accessed). The distributed computing system may be implemented according to a distributed computing framework. As a non-limiting example of a framework for implementing such distributed computing systems, the Apache™ Hadoop® open source software library provides a framework that allows for the distributed processing of large data sets across clusters of compute nodes using simple programming models. This library provides an implementation of a distributed processing architecture called MapReduce, which includes a programming model for processing large data sets with a parallel, distributed algorithm on a cluster.

In various embodiments, a MapReduce program may include a Map( ) procedure (sometimes referred to herein as a "mapper process" or a "mapper") that performs filtering and sorting and a Reduce( ) procedure (sometimes referred to herein as a "reducer process" or a "reducer") that performs a summary operation. For example, under this approach, a parallel application (or a parallel computation or task of an application) may be mapped to a set of computing nodes (e.g., hosts or servers) for processing. The results of the computation performed by those computing nodes may then be reduced down to a single output data set. One node, designated as the master node, may control the distribution of tasks by the other computing nodes (e.g., slave nodes that may also be referred to as "worker nodes"). In some embodiments, a service provider may provision a collection of virtualized resource instances as computing nodes in a MapReduce cluster, and the computing nodes of the MapReduce cluster may obtain data from and/or write data to virtualized storage resources via an object storage service. Note that a MapReduce cluster may be created with an arbitrary number of computing nodes, and not all of the computing nodes of a MapReduce cluster need to be assigned (or configured) as mappers or reducers. Also note that there may not (necessarily) be a one-to-one mapping between mapper processes (or reducer processes) and computing nodes. For example, multiple mapper processes may be run on a single computing node.

MapReduce and MPI are commonly used parallel programming paradigms. For example, either of these techniques may be employed to perform high-performance computing (HPC) applications or large and/or complex computations thereof (e.g., computational fluid dynamics simulations for aerospace or mechanical engineering, or molecular fluid dynamics simulations) in distributed computing environments. In some embodiments, the systems described herein may provide a framework in which MPI programs may be executed on top of MapReduce clusters on behalf of clients (e.g., client applications, end users, service subscribers, or third party services that are customers of the service). For example, various methods may be used to configure a secure MapReduce job flow in which the worker nodes (hosts) can communicate with each other using MPI messaging. For example, secure communication between any pair of worker nodes (hosts) using a secure shell type protocol requires a common key pair. In some embodiments of the systems described herein, in order to provide secure communications for MPI messaging (e.g., using a secure shell type protocol), a single pair of keys may be created and shared between all of the computing nodes of a MapReduce cluster. In addition, in order to execute MPI jobs using a MapReduce job flow, an MPI job may be submitted as a single MapReduce step (e.g., one with only a single mapper process and no reducer process). The mapper process may then call an mpirun or mpiexec agent in order to launch the MPI job, which may then fork its own commands to all of the computing nodes (hosts) according to the MPI interface and protocols.

Various embodiments of methods and systems for performing MapReduce jobs (and/or MPI jobs) on distributed systems (e.g., MapReduce clusters) are described herein. FIG. 1 illustrates an example system environment that may be used for performing MapReduce jobs (and that may also be used to perform MPI jobs), according to various embodiments. The example system environment may implement a distributed computation system 100. The distributed computation system 100 may include one or more master nodes 110 and a plurality of worker nodes 120 such as worker nodes 120A-120N. The master node(s) 110 may represent one or more coordinator processes that coordinate computations performed by the worker nodes 120. The worker nodes may also be referred to herein as "worker hosts," "workers," or "hosts." The distributed computation system 100 may use one or more networks or interconnections to couple the various components. Elements of the distributed computation system 100 may be located in any suitable location relative to one another, from being virtual compute instances hosted on the same computing hardware to being different physical compute instances hosted in the same data center to being geographically remote. In some embodiments, the master node(s) 110 and worker nodes 120 may implement a MapReduce architecture in which the worker nodes perform similar tasks concurrently under the direction of the master node(s). However, it is contemplated that the distributed computation system 100 may implement other types of distributed computation architectures instead of or in addition to MapReduce.

Using the distributed computation system 100, a set of input data 160 may be processed by the worker nodes 120 to produce a set of output data 170. The input data 160 may be split into a plurality of partitions, such as input partitions 160A and 160B through 160N. One or more of the partitions of the input data 160 may be assigned to each of the worker nodes 120. The input data 160 may be split into partitions on any suitable basis. For example, partition boundaries may be based on the boundaries between individual records, individual lines of data, etc. An individual partition may include elements of input data, such as related items or families of items that are intended to be processed together by a single worker node. Although three partitions 160A, 160B, and 160N are illustrated for purposes of example, it is contemplated that any suitable number of partitions of input data may be processed using the distributed computation system 100. The assignment of individual partitions to individual worker nodes as shown in FIG. 1 is presented for purposes of example and illustration; it is contemplated that any suitable assignment of individual partitions to individual worker nodes may be used with the distributed computation system 100.

In some embodiments, the master node(s) 110 may provide individual partition(s) of the input data 160 to individual worker nodes, e.g., by performing aspects of the partitioning of the input data and/or aspects of the assignment of individual partitions to individual worker nodes. In one embodiment, the master node(s) 110 may send data indicative of partition assignments to individual worker nodes, and each worker node may acquire its one or more partitions of input data using any suitable technique. For example, a worker node may read a portion of the input data from one or more files or storage locations in one or more storage devices that are accessible to the worker nodes, e.g., over a network. Alternatively, the master node(s) 110 may directly send the relevant partition(s) to individual worker nodes using a network. In various embodiments, the partition(s) of input data to be processed using a particular worker node may be loaded into memory at the particular worker node either partially or entirely before the processing of the partition(s) is initiated.

Each of the worker nodes 120 may perform any suitable processing tasks to generate one or more partitions of the output data 170 based on one or more partitions of the input data 160. In one embodiment, the processing tasks implemented using the worker nodes 120 may be provided by the master node(s) 110, e.g., by sending program code to the worker nodes or instructing the worker nodes to load the program code from one or more storage locations. At least a portion of the processing tasks performed by the worker nodes 120 may be performed concurrently, i.e., in parallel relative to each other. In some embodiments, each of the worker nodes 120 may perform similar tasks and/or implement similar algorithms to process its partition(s) of the input data. As a result of the processing of the input data 160, each of the worker nodes 120 may produce one or more partitions of output data 170. Although two output partitions 170A and 170N are illustrated for purposes of example, it is contemplated that any suitable number of output partitions may be generated using the distributed computation system 100. As they are produced by the worker nodes 120, the output partitions 170A-170N may be stored in one or more storage locations on one or more storage devices that are accessible to the worker nodes. The output partitions 170A-170N may also be referred to as final output data. In one embodiment, the output partitions 170A-170N may be further processed by the master node(s), e.g., by aggregating or concatenating the individual partitions into a single output file.

The computation performed by each of the worker nodes 120 may include multiple stages of computation, such as a first stage and a second stage. The first stage may be a map stage (in which a mapper process is performed), such as map stage 130A performed by worker node 120A and map stage 130N performed by worker node 120N. The second stage may be a reduce stage (in which a reducer process is performed), such as reduce stage 140A performed by worker node 120A and reduce stage 140N performed by worker node 120N. In one embodiment, the map stage may include any computation(s) to generate intermediate output based on the input data 160. In one embodiment, the intermediate output may be partitioned but not necessarily sorted. As used herein, the term "partitioned" indicates that related elements of data are grouped together into partitions. Typically, the elements of data in a particular partition are intended to be processed using the same host. In one embodiment, the reduce stage may include any computation(s) to generate final output 170 based on the intermediate output. For example, the reduce stage may aggregate elements of the data produced by the map stage.

It is contemplated that the distributed computation system 100 may include additional components not shown, fewer components than shown, or different combinations, configurations, or quantities of the components shown. Although two worker nodes 120A and 120N are illustrated for purposes of example, it is contemplated that any suitable number of worker nodes may be used in conjunction with the distributed computation system 100. Although one master node 110 is illustrated for purposes of example, it is contemplated that any suitable number of master nodes 110 may be used in conjunction with the distributed computation system 100. In various embodiments, any of the worker nodes 120 and/or master node(s) 110 may be implemented as virtual compute instances or as physical compute instances. The distributed computation system 100 may include one or more computing devices, any of which may be implemented by a computing device similar to the example computer system illustrated in FIG. 16. In various embodiments, the functionality of the different components of the distributed computation system 100 may be provided by the same computing device or by different computing devices. If any of the various components are implemented using different computing devices, then the respective computing devices may be communicatively coupled, e.g., via one or more networks. Each component of the distributed computation system 100 may represent any combination of software and hardware usable to perform their respective functions, as discussed as follows.

In some embodiments, the distributed computation system 100 may manage the allocation of network-accessible resources. Networks set up by an entity such as a company or a public sector organization to provide one or more services (such as various types of cloud-based computing or storage) accessible via the Internet and/or other networks to a distributed set of clients may be termed provider networks. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

In some embodiments, operators of provider networks may implement a flexible set of resource reservation, control, and access interfaces for their clients. For example, a provider network may implement a programmatic resource reservation interface (e.g., via a web site or a set of web pages) that allows clients to learn about, select, purchase access to, and/or reserve resource instances. In one embodiment, resources may be reserved on behalf of clients using a client-accessible service that implements the distributed computation system 100. According to one such embodiment, the distributed computation system 100 in such an environment may receive a specification of one or more tasks to be performed for a client, along with a set of input data or an indication of a source of input data to be used by the task(s). In response, the distributed computation system 100 may determine an execution plan for implementing the task(s) using one or more resources of a selected resource pool of the provider network. In one embodiment, the resource pool may be automatically selected based on the anticipated computational needs of the various tasks. In one embodiment, the resource pool may be selected based on a specific resource request or reservation submitted by the client. The distributed computation system 100 may schedule an execution of the task(s) using the selected resources.

In some embodiments, the client may use one or more suitable interfaces (such as one or more web pages, an application programming interface (API), or a command-line interface) to specify the task(s) to be implemented, the input data set, the computing resources to be used, and/or a time at which the task(s) should be initiated. In one embodiment, the client may be able to view the current execution status of the task(s) using the interface(s). In one embodiment, additional information about executed tasks may be available via the interface(s), such as program output, error logs, exception logs, and so on.

Figure 2:
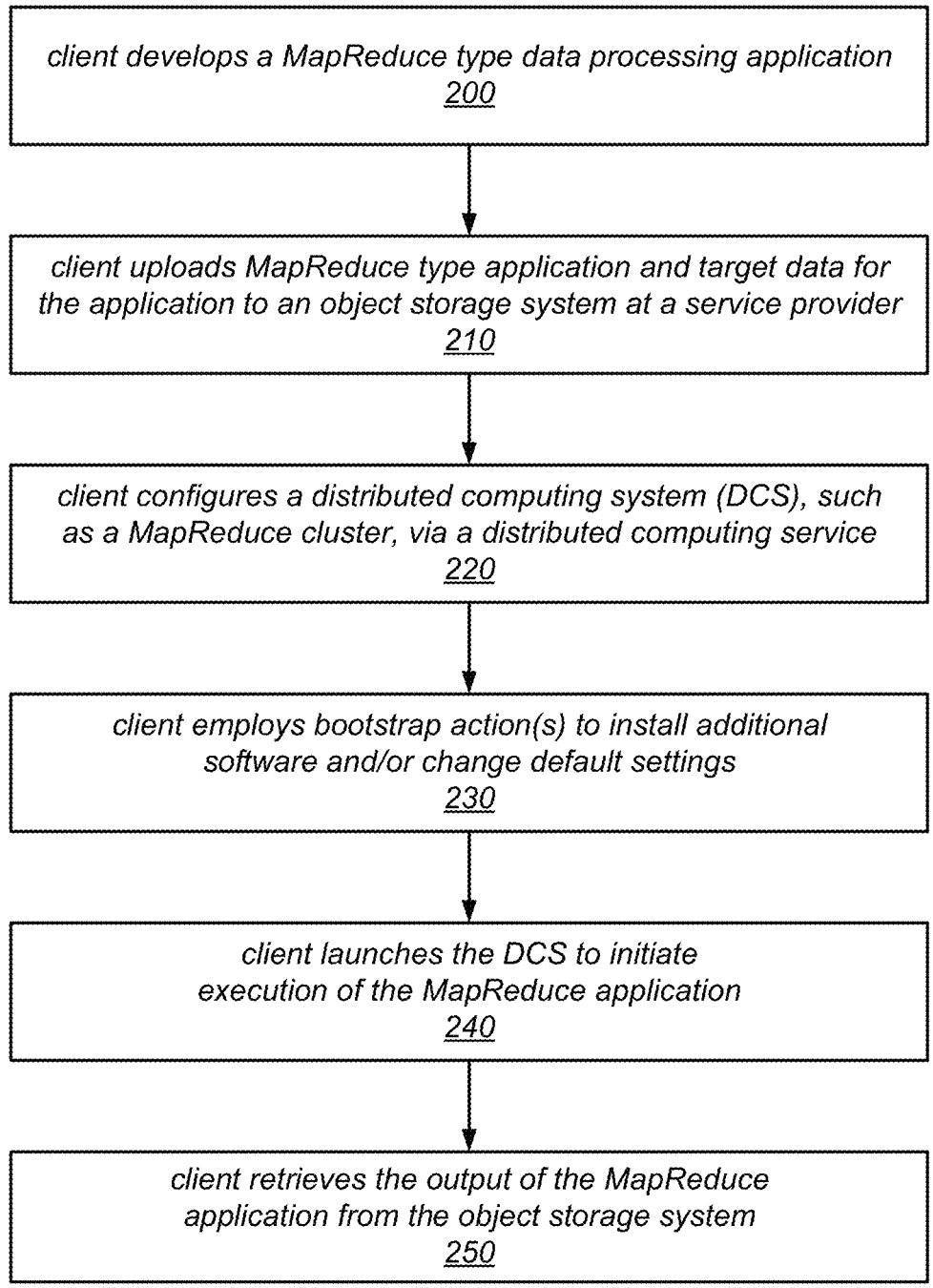
FIG. 2 is a flow diagram illustrating one embodiment of a method for performing a MapReduce type data processing application in a distributed computing system.

One embodiment of a method for performing a MapReduce type data processing application in a distributed computing system (on a MapReduce cluster) is illustrated by the flow diagram in FIG. 2. As illustrated at 200, in this example, the method may include a client developing a MapReduce type data processing application. Note that, in different embodiments, such an application may be developed using any of a variety of programming languages. The method may include the client uploading the MapReduce type application and target data for the application to an object storage system at a service provider, as in 210. For example, the data may be uploaded to one or more physical storage devices of the service provider using an import feature or other input interface of the service, by establishing a dedicated network connection to the service provider, or by writing the data directly to a cluster that is already running, in different embodiments.

As illustrated in this example, the method may include the client configuring (or requesting the configuration of) a distributed computing system (DCS), such as a MapReduce cluster, via a distributed computing service, as in 220. For example, the client may configure (or request the configuration of) a cluster of computing nodes (hosts) to collectively execute MapReduce type applications on behalf of service clients, where each node (host) includes one or more CPU cores. In some embodiments, the client may be able to specify various parameters of the cluster and/or the job to be executed on the cluster (e.g., the number of virtualized resource instances to provision in the cluster, the types of instances to use, the applications to install, and/or the locations of the application and its target data) through a GUI, command line interface, script, API, or another interface mechanism.

As illustrated at 230 in FIG. 2, the method may include the client employing one or more bootstrap actions to install additional software and/or to change one or more default configuration settings of the DCS (e.g., the MapReduce cluster). Bootstrap actions are scripts that are run on each of the cluster nodes when the cluster is launched (e.g., before the MapReduce application starts and before the node begins processing data). In various embodiments, the client may invoke custom bootstrap actions, or may invoke predefined bootstrap actions provided by the service provider. The method may also include the client launching the DCS (e.g., the MapReduce cluster) to initiate the execution of the MapReduce application, as in 240, and (as the application executes or once it has finished executing), the client retrieving the output of the MapReduce application from the object storage system, as in 250.

Note that, in some embodiments, the service provide may automatically terminate the DCS (e.g., the MapReduce cluster) when processing of the MapReduce application is complete (not shown). In other embodiments, the DCS (e.g., the MapReduce cluster) may be kept running after processing of the MapReduce application is complete, and the client may be able to submit more work to the DCS/cluster. Note also that, in some embodiments, the client may be able to monitor the health of the DCS (e.g., the MapReduce cluster) and/or the progress of the MapReduce application various monitoring tools or utilities that are exposed by the service provider using (e.g., through a GUI, command line interface, script, API, or another interface mechanism). In some embodiments, the client may be able to add capacity to or remove capacity from the DCS/cluster at any time in order to handle more or less data. The service provider may also expose one or more debugging utilities (e.g., through a GUI, command line interface, script, API, or another interface mechanism), in some embodiments.

Figure 3:
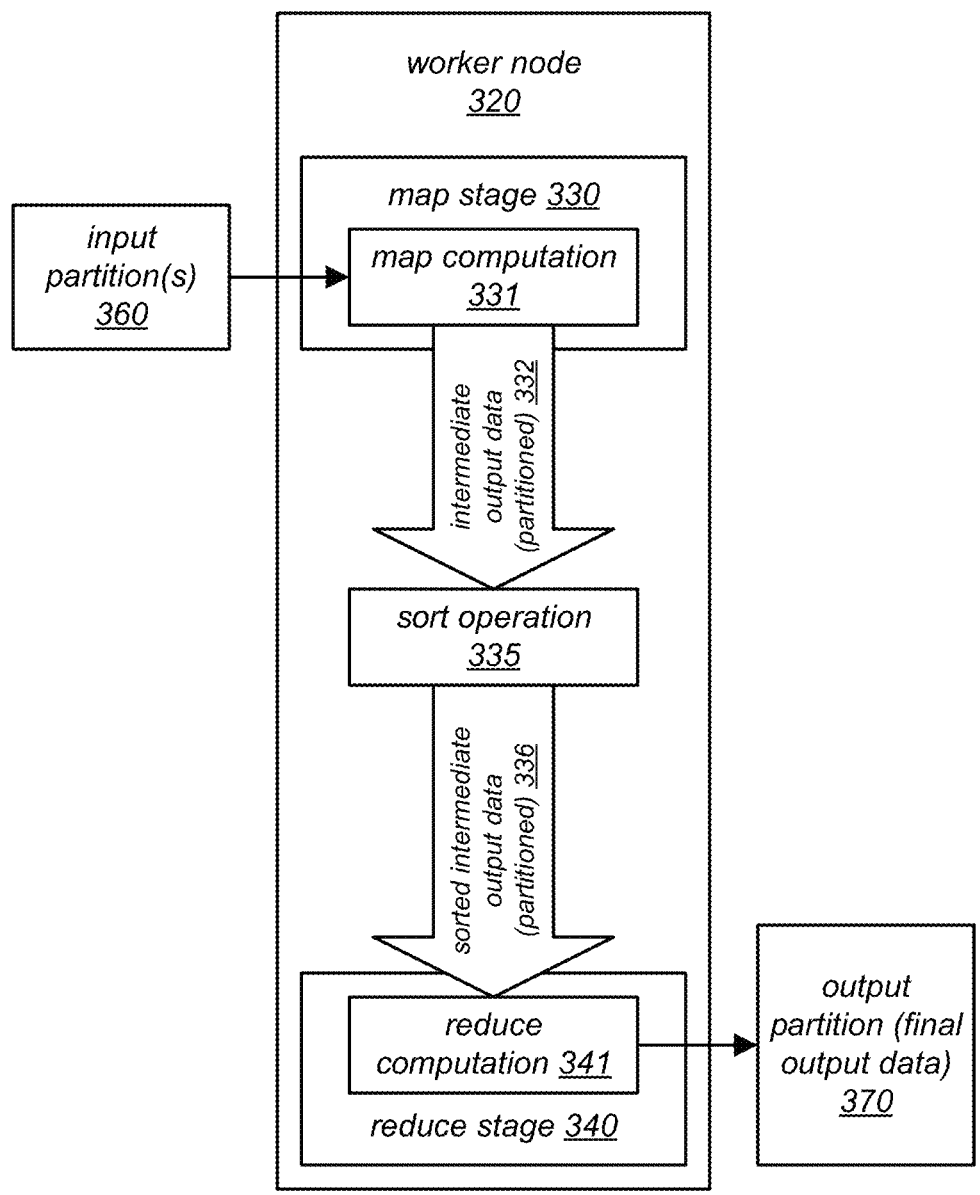
FIG. 3 illustrates a worker node configured for performing a MapReduce job, according to one embodiment.

One embodiment of a worker node that is configured for performing MapReduce jobs (and that may also be used for performing MPI jobs, in some cases) is illustrated by the block diagram in FIG. 3. As illustrated in this example, a worker node (such as worker node 320) may use one or more input partition(s) 360 as input and produce an output partition (i.e., final output data) 370. The worker node 320 may be implemented in the same manner as discussed above with respect to worker nodes 120A-120N illustrated in FIG. 1. The processing of the input partition(s) 360 may include a map stage 330 and a reduce stage 340 performed using the worker node 320.

As illustrated in this example, the map stage 330 may include a map computation 331. The map computation 331 may include the execution of program instructions using elements of the input partition(s) 360 as input. The program code used in the map computation 331 may be specified by a master node (such as one of the master nodes 110 illustrated in FIG. 1). The map computation 331 may generate intermediate output data 332. The intermediate output data 332 may be partitioned such that related elements of data are grouped together on the same worker node 320. The partitioning of the intermediate output data 332 may indicate that the intermediate output data 332 contains related elements of data (e.g., data for items and/or families of items). The partitioning of the intermediate output data 332 may indicate that the elements of data in the intermediate output data 332 may be processed together in the reduce stage 340, i.e., processed in the reduce stage using a single worker node and without re-partitioning and distribution to multiple worker nodes.

In some embodiments, a sort operation 335 may be performed between the map stage 330 and the reduce stage 340. The sort operation 335 may sort elements of data in the intermediate output data 332 to produce sorted intermediate output data 336. The intermediate output data 332 may be sorted based on any suitable key(s) or field(s) of data, such as the key(s) or field(s) of data required by the reduce stage 340.

As illustrated in this example, the reduce stage 340 may include a reduce computation 341. The reduce computation 341 may include the execution of program instructions using elements of the intermediate output data 332 or sorted intermediate output data 336 as input. The program code used in the reduce computation 341 may be specified by a master node (such as one of the master nodes 110 illustrated in FIG. 1). The reduce computation 341 may generate final output data 370. In some embodiments, the reduce computation 341 may perform an aggregation of the intermediate output data 332 or sorted intermediate output data 336. Note that in other embodiments, a sort operation may be performed by the worker node 320 as part of the reduce stage 340. In some embodiments, the map stage 330 and reduce stage 340 may be performed using computations executed on the same worker node 320, and intermediate data 332 or 336 may not be provided to another worker node.

Figure 4:
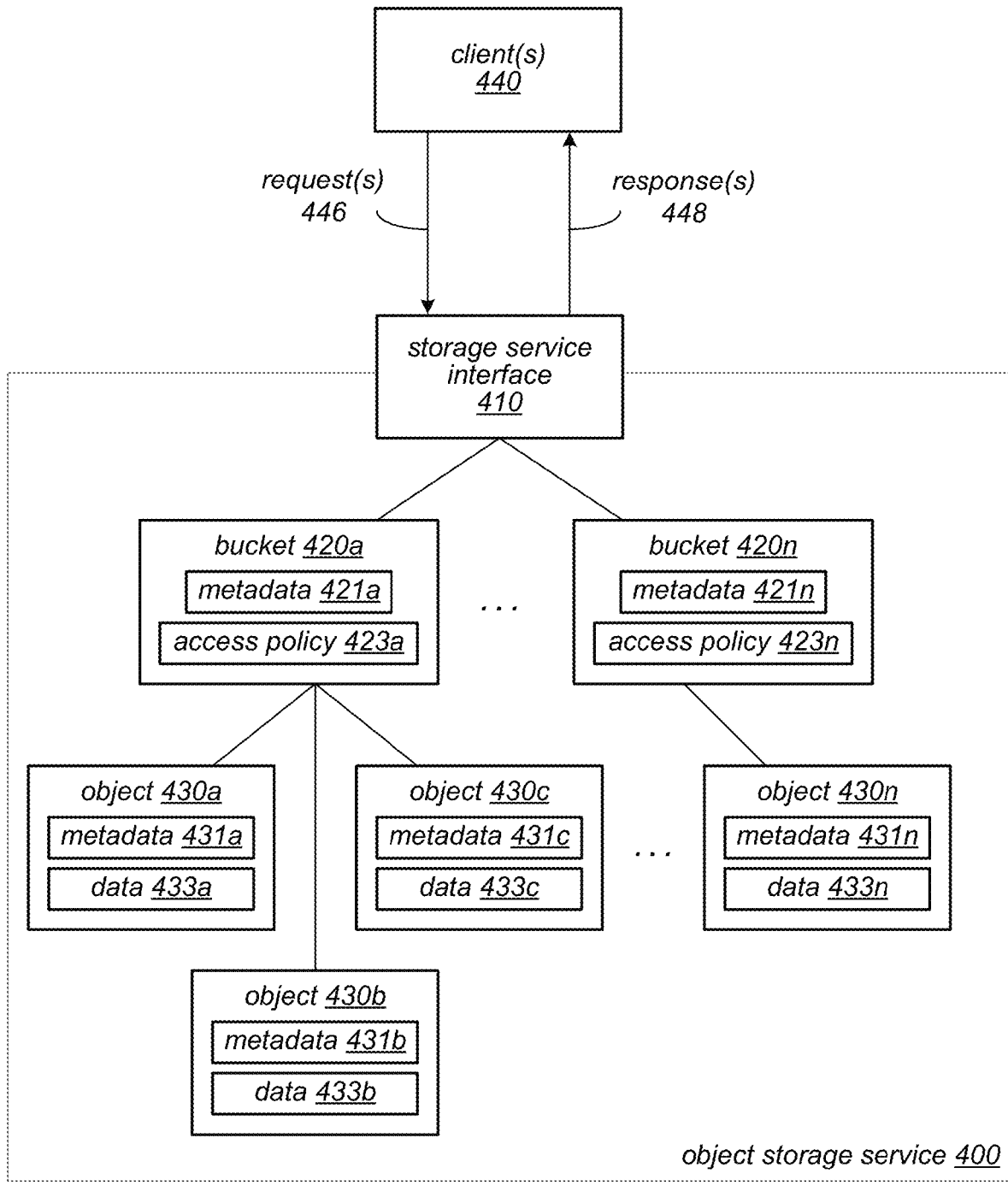
FIG. 4 illustrates an example embodiment of an object storage model for providing virtualized storage resources to clients as a service.

One example embodiment of an unstructured object storage model for providing virtualized storage resources to clients as a service, such as a web service, is illustrated in FIG. 4. In the illustrated model, storage service interface 410 is provided as a client-facing interface to object storage service 400. Storage service interface 410 may, for example, be implemented as, or alternatively may include, an application programming interface (API). According to the model presented to a client 440 by interface 410, the storage service may be organized as an arbitrary number of buckets 420a-n accessible via interface 410. In general, a bucket is a logical container in which objects may be stored in a storage system on behalf of a user, where the objects are the fundamental entities stored in the storage system. In some embodiments, the stored objects may include object data and/or metadata. For example, each object may include a data object portion, and a metadata portion In some embodiments, every object may be contained in a bucket, and every object may be addressable using a combination of a bucket identifier and one or more identifiers of the object itself (e.g., a user key or a combination or a user key and a version identifier).

In the example illustrated in FIG. 4, each bucket 420 may be configured to store an arbitrary number of objects 430a-n, each of which may store data specified by a client 440 of the storage service 400 (shown as data 433a-n) and/or metadata (shown as 431a-n). In various embodiments, metadata 431a-n may be specified by a client 440 or may be generated by object storage service 400. One or more clients 440 may submit requests to the storage service interface to store, retrieve, and, as described in more detail below, perform one or more operations on data object 430. Storage service interface may provide responses 448 to the requests, which may include acknowledgements and/or retrieved data, for example. Generally, in addition to storage and retrieval of data objects, the requests or commands that the storage service 400 may perform may include commands that modify data within the storage service 400. In this way, the clients 440 are not burdened with removing the data from the storage service 400, performing the operations, and then returning the modified data to the storage service. This configuration may save network bandwidth and processing resources for the clients 440, for example.

In some embodiments storage service interface 410 may be configured to support interaction between the storage service 400 and its client(s) 440 according to a web services model. For example, in one embodiment, interface 410 may be accessible by clients as a web services endpoint having a Uniform Resource Locator (URL) to which web services calls generated by service clients may be directed for processing. Generally speaking, a web service may refer to any type of computing service that is made available to a requesting client via a request interface that includes one or more Internet-based application layer data transport protocols, such as a version of the Hypertext Transport Protocol (HTTP) or another suitable protocol.

In at least some embodiments, the object storage service 400 may be configured to internally replicate data objects for data redundancy and resiliency purposes. However, the object storage service 400 does not guarantee that an access of a data object stored in the storage service 400 will always return a latest or most recent version of the data object. This property of a storage service such as object storage service 400 may be referred to herein as "eventual consistency", as a data object is generally guaranteed to be only eventually consistent across all instances. In other embodiments, object storage service 400 may support a strong consistency model, which may guarantee that an access of a data object stored in the storage service will return a latest or most recent version of the data object.

In some embodiments, an object storage service (such as object storage service 400) may provide storage for a data set that is to be downloaded and processed by a MapReduce application (or computation thereof) or MPI application (or computation thereof) that is executing on a distributed computing system (such as a MapReduce cluster) and/or output data that is produced by such applications. In some embodiments, an object storage service (such as object storage service 400) may provide storage for other types of data or metadata, including, but not limited to, key pairs, hostfiles, rankfiles, or configuration or operating parameters for a MapReduce job or an MPI job, or any other information usable when executing such applications. In other embodiments, any or all of these elements may be stored in one or more object data stores having a different model and/or configuration than that illustrated in FIG. 4.

Note that, in some embodiments, the data object portion of an object may be opaque to the storage system, i.e. it may be treated as a "black box" entry by the storage system. In various embodiments, the default metadata of an object may include, e.g., a name-value pair, the date the object was last modified, and/or an indicator of the content type (i.e., the data type of the contents of the data object portion of the object). In some embodiments, the metadata associated with an object may include system interjected key-value pairs (containing, for example, a creation date and/or a last modified date, or other versioning related metadata), along with user supplied key-value pairs. In some embodiments, metadata associated with and/or stored in an object may include an access control list (ACL). In some embodiments, a developer may be able to specify custom metadata at the time an object is stored. In various embodiments, the amount of metadata that can be associated with a given object may be restricted by the limits of the interface used, and/or the amount of data allowed or supported by the system for a request or response message.

In various embodiments, the storage systems described herein may include support for the following storage related tasks: creating buckets, storing and retrieving data in buckets (e.g., using a unique key, which may be assigned by the developer of the data or owner of the bucket), deleting data, and/or listing stored objects. In some embodiments, a user may need to have special permission (e.g., a particular access role) to be able to perform certain operations in the storage system. For example, a user may need to be designated as a privileged user in the system (and/or for a particular bucket in the system) in order to check a versioning state, modify a versioning state, delete objects and/or keys, retrieve logically deleted data, set permissions on buckets or objects thereof, etc. In another example, a user may need to have a particular access role in order to list stored objects and/or retrieve stored objects. In some embodiments, such permissions may be automatically granted to and/or controlled by the bucket owner. In other embodiments, such privileges may be designated and/or granted to users by other means and/or based on factors other than bucket ownership. In various embodiments, some or all of these permissions may be granted and/or controlled on a bucket basis. In other embodiments, one or more of these permissions may be granted and/or controlled on an individual object basis, or on the basis of the object type or content type.

Figure 5:
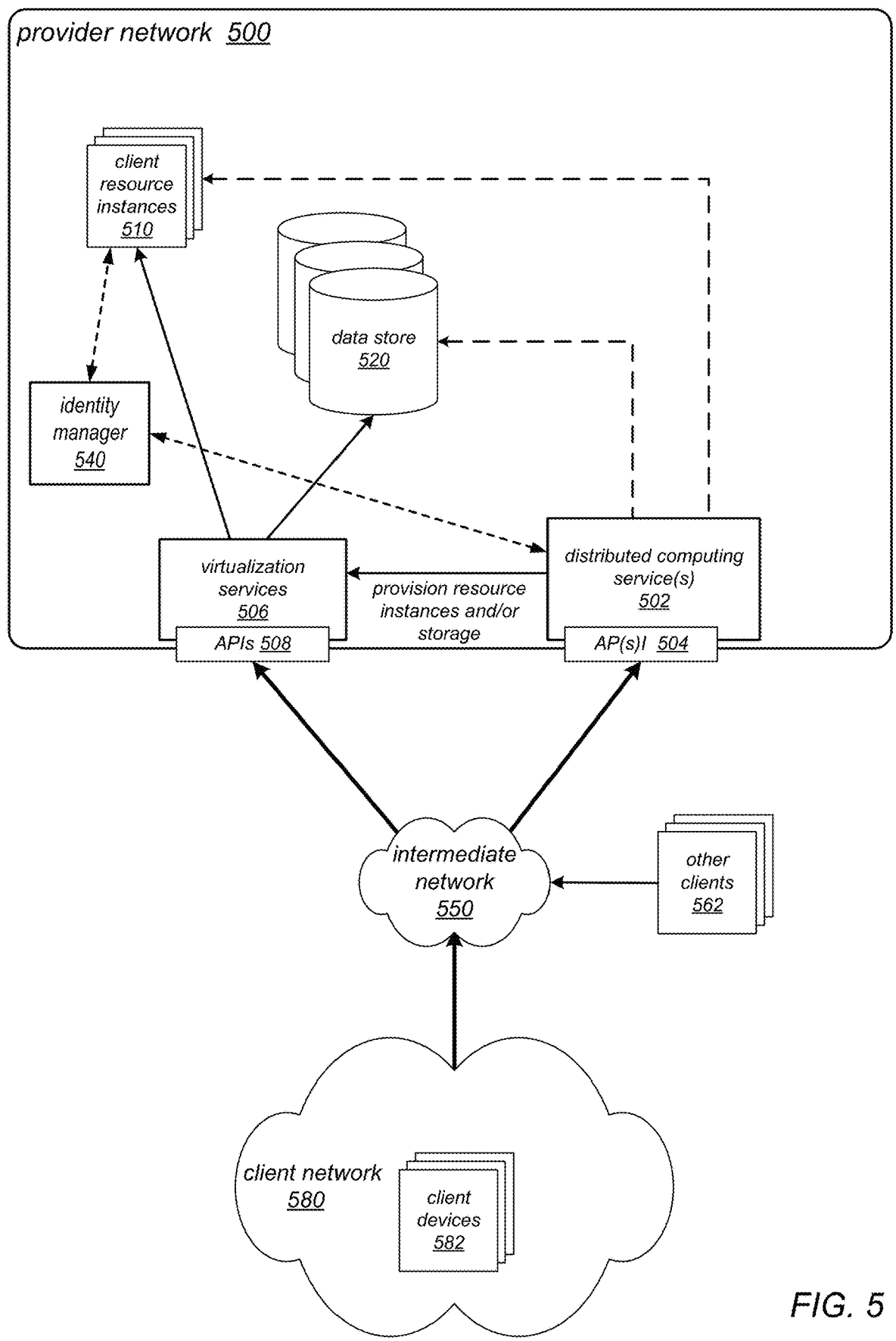
FIG. 5 illustrates an example service provider network environment in which embodiments of methods and apparatus for performing high-performance computing jobs on isolated MapReduce clusters may be implemented.

Embodiments of a distributed computing system are generally described herein in the context of a service provider that provides to clients, via an intermediate network such as the Internet, virtualized resources (e.g., virtualized computing and storage resources) implemented on a provider network of the service provider. FIG. 5 illustrates an example service provider network environment in which embodiments of methods and apparatus for providing data storage in distributed computing systems may be implemented. Other example environments in which embodiments of a distributed computing system that executes MapReduce jobs and/or MPI jobs on a MapReduce cluster may be implemented are illustrated in other ones of the drawings and are described below. These examples are not intended to be limiting.

In the example illustrated in FIG. 5, the service provider may provide one or more services (referred to as distributed computing service(s) 502) to clients (e.g., clients on client network 582 or other clients 562) via which the clients may provision, manage, and operate distributed computing systems at least partially on a provider network 500. In at least some embodiments, provisioning a distributed computing system via the distributed computing service(s) 502 may include provisioning one or more virtualized computing resources (shown as client resource instances 510) as compute nodes for the distributed computing system and provisioning virtualized storage (shown as data store 520) as data storage for data sets used in the distributed computing system and/or as data storage for results of computations performed on behalf of various clients. Note that client resource instances 510 and/or data store 520 may be otherwise provisioned in various embodiments. For example, as an alternative, in at least some embodiments, a client (e.g., as represented by client network 580) may provision one or more client devices 582 on an external client network as compute nodes for the distributed computing service, while provisioning storage for the data set to be used in the distributed computing system on a data store 520 via distributed computing service(s) 502. Note that, in various embodiments, data store 520 may implement object storage, block-based storage, and/or volume-based storage, as described herein.

Note that, in at least some embodiments, client(s) may interact with distributed computing service(s) 502 via one or more application programming interfaces (API(s) 504) to request provisioning of computation and storage resources on provider network 500 for specific distributed computing systems (e.g., MapReduce clusters), and distributed computing service(s) 502 may in turn interact with virtualization service(s) 506 via API(s) 508 to actually provision the computation and storage resources on provider network 500. However, in some embodiments, distributed computing service(s) 502 may directly interact with computation and storage resources on provider network to provision or otherwise configure the resources for specific distributed computing systems.

In at least some embodiments, the service provider may implement such distributed computing systems (e.g., MapReduce clusters) on behalf of clients according to a distributed computing framework, for example the Apache™ Hadoop® framework. Note, however, that other frameworks may be used in some embodiments.

Figure 15:
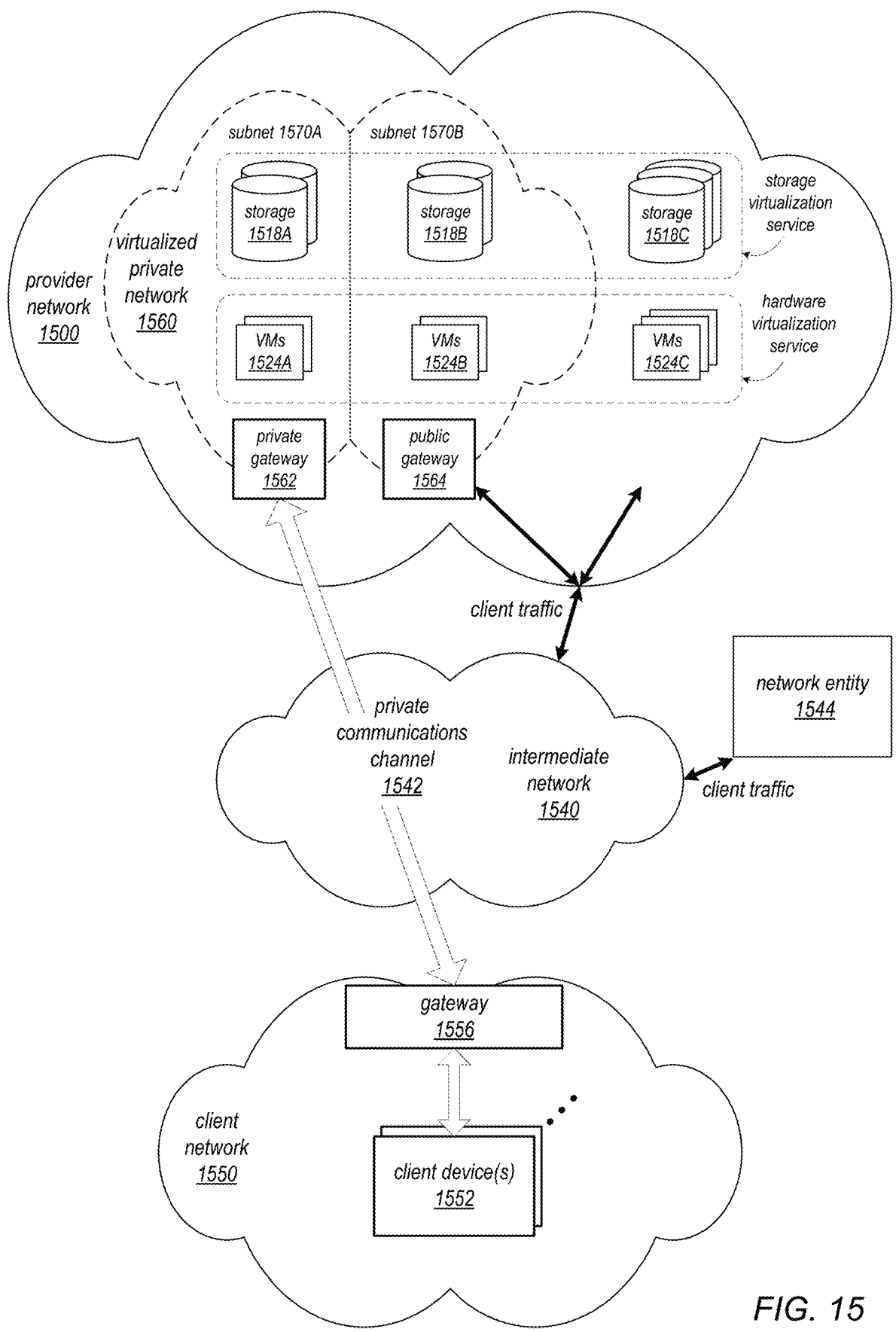
FIG. 15 illustrates an example provider network that provides virtualized private networks to at least some clients, according to at least some embodiments.

In at least some embodiments, at least some of the resources provided to clients of the service provider via the provider network 500 may be virtualized computing resources implemented on multi-tenant hardware that is shared with other client(s) and/or on hardware dedicated to the particular client. Each virtualized computing resource may be referred to as a resource instance or as a client resource instance (e.g., client resource instances 510). Resource instances 510 may, for example, be rented or leased to clients of the service provider. For example, clients of the service provider may access one or more services 506 of the provider network via API(s) 508 to the services 506 to obtain and configure resource instances 510 and to establish and manage virtual network configurations that include the resource instances 510, for example virtualized private networks as illustrated in FIG. 15. The resource instances 510 may, for example, be implemented according to hardware virtualization technology that enables multiple operating systems to run concurrently on a host computer, i.e. as virtual machines (VMs) on the hosts. A hypervisor, or virtual machine monitor (VMM), on a host presents the VMs on the host with a virtual platform and monitors the execution of the VMs. Each VM may be provided with one or more private IP addresses; the VMM on a host may be aware of the private IP addresses of the VMs on the host. Examples of the implementation and use of hardware virtualization technologies are further illustrated in FIG. 13 and described below.

In at least some embodiments, at least some of the resources provided to clients of the service provider via the provider network 500, virtualization service(s) 506, and API(s) 508, may be virtualized storage resources implemented on storage hardware on the provider network 500 that may be shared with other client(s). Virtualized data store technology may be used in various embodiments to provide different types of data storage and storage services for clients. For example, an object storage service may provide general, unstructured data object-based storage (which may be representing in FIG. 5 by data store 520) to clients via which the clients may store and retrieve arbitrary types of data objects (some of which may include data files). As illustrated in FIG. 5, the unstructured object store (shown as data store 520) provided by the object storage service may, for example, be used to store data sets for distributed computing systems provisioned through the distributed computing service(s) 502. As another example, not shown in FIG. 5, a data storage service, for example a database service provided by the service provider or by some other entity, may provide a structured data model (e.g., a database model) to the clients for storing and retrieving structured data.

As illustrated in FIG. 5, in some embodiments, a provider network 500 may include an identity manager 540. Various embodiments of an identity manager are described in more detail below in reference to identity and access management functions and in reference to FIG. 7.

In the example provider network illustrated in FIG. 5, the distributed computing system may include one or more compute nodes. The compute nodes may be provisioned as client resource instances 510 as shown in FIG. 5, or alternatively may be provisioned as client devices 582 on a client network 580 or on clients 562 as shown in FIG. 5. A data set for the distributed computing system may be instantiated on data store 520. In some embodiments, to process data from the data set, compute nodes may access data store 520 via an object storage service (not shown). In at least some embodiments, such an object storage service may provide one or more one or more APIs via which the compute nodes or other entities may access data store 520. In some embodiments, processed data (e.g., output data) may be, but is not necessarily, written back to data store 520. In some cases, at least some of the processed data that is written back to data store 520 may be accessed by one or more of the compute node(s). For example, a job (e.g., a MapReduce job) may read data from data store 520 and write output data to data store 520. A subsequent job (e.g., another MapReduce job) may then attempt to access at least some of the output data from data store 520.

An unstructured object store provided via an object storage service may have advantages, including, but not limited to, the ability to store very large data sets, high throughput, reliability and high availability due to features such as data replication, and flexibility. A client may leverage such an object storage service to easily, and relatively inexpensively, provision additional storage as needed without having to install and configure additional storage devices on the client's network. An object storage service, because of features such as data replication, may, in some embodiments, have the property of eventual consistency, in some embodiments. In other embodiments, it may implement a strong consistency model. In at least some embodiments, each of the compute nodes provisioned as client resource 510 may include one or more processing modules that may implement processing portions of the distributed computing system (for example MapReduce procedures). A compute node may also include one or more data access modules that access a data storage service to obtain metadata or access data objects (or data files) maintained in data store 520 by an object storage service on behalf of its processing module(s). In at least some embodiments, the object storage service may provide one or more APIs via which data access module(s) on various compute nodes provisioned as client resource 510 may access the respective services.

Figure 6:
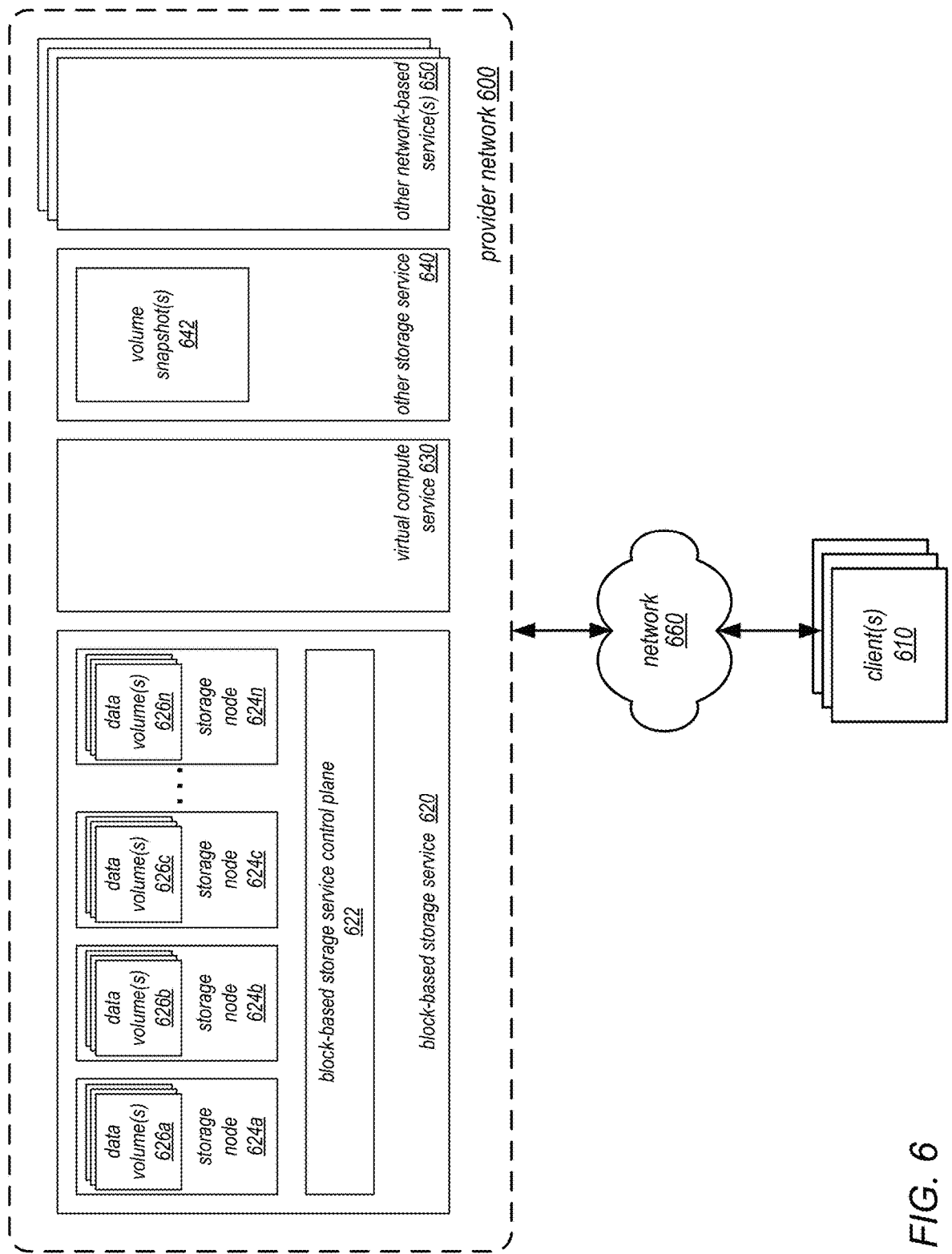
FIG. 6 is a block diagram illustrating a provider network that implements multiple network-based services including a block-based storage service, according to some embodiments.

FIG. 6 is a block diagram illustrating a provider network that implements multiple network-based services including a block-based storage service, according to some embodiments. Provider network 600 may be set up by an entity such as a company or a public sector organization to provide one or more services (such as various types of cloud-based computing or storage) accessible via the Internet and/or other networks to clients 610. Provider network 600 may include numerous data centers hosting various resource pools, such as collections of physical and/or virtualized computer servers, storage devices, networking equipment and the like (e.g., computer system 1600 described below with regard to FIG. 16), needed to implement and distribute the infrastructure and services offered by the provider network 600. In some embodiments, provider network 600 may provide computing resources, such as virtual compute service 630, storage services, such as block-based storage service 620 and other storage service 640 (which may include various storage types such as object/key-value based data stores or various types of database systems), and/or any other type of network-based services 650. Clients 610 may access these various services offered by provider network 600 via network 660. Likewise, network-based services may themselves communicate and/or make use of one another to provide different services. For example, computing resources offered to clients 610 in units called "instances," such as virtual or physical compute instances or storage instances, may make use of particular data volumes 626, providing virtual block storage for the compute instances.

As noted above, virtual compute service 630 may offer various compute instances to clients 610. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 630 in different embodiments, including general purpose or special purpose computer servers, storage devices, network devices and the like. In some embodiments instance clients 610 or other any other user may be configured (and/or authorized) to direct network traffic to a compute instance. In various embodiments, compute instances may attach or map to one or more data volumes 626 provided by block-based storage service 620 in order to obtain persistent block-based storage for performing various operations.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client applications, without for example requiring the client 610 to access an instance. Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristics, may vary. Configurations of compute instances may also include their location, in a particular data center, availability zone, geographic, location, etc., and (in the case of reserved compute instances) reservation term length.

In various embodiments, provider network 600 may also implement block-based storage service 620 for performing storage operations. As illustrated in this example, block-based storage service 620 may be a storage system, composed of a pool of multiple independent storage nodes 624a, 624b, 624c through 624n (e.g., server block data storage systems), which provides block level storage for storing one or more sets of data volumes data volume(s) 626a, 626b, 626c, through 626n. Data volumes 626 may be mapped to particular clients, providing virtual block-based storage (e.g., hard disk storage or other persistent storage) as a contiguous set of logical blocks. In some embodiments, a data volume 626 may be divided up into multiple data chunks (including one or more data blocks) for performing other block storage operations, such as snapshot operations or replication operations. A volume snapshot of a data volume 626 may be a fixed point-in-time representation of the state of the data volume 626. In some embodiments, volume snapshots 642 may be stored remotely from a storage node 624 maintaining a data volume, such as in another storage service 640. Snapshot operations may be performed to send, copy, and/or otherwise preserve the snapshot of a given data volume in another storage location, such as a remote snapshot data store in other storage service 640.

Block-based storage service 620 may implement block-based storage service control plane 622 to assist in the operation of block-based storage service 620. In various embodiments, block-based storage service control plane 622 assists in managing the availability of block data storage to clients, such as programs executing on compute instances provided by virtual compute service 630 and/or other network-based services located within provider network 600 and/or optionally computing systems (not shown) located within one or more other data centers, or other computing systems external to provider network 600 available over a network 660. Access to data volumes 626 may be provided over an internal network within provider network 600 or externally via network 660, in response to block data transaction instructions.

Block-based storage service control plane 622 may provide a variety of services related to providing block level storage functionality, including the management of user accounts (e.g., creation, deletion, billing, collection of payment, etc.). Block-based storage service control plane 622 may further provide services related to the creation, usage and deletion of data volumes 626 in response to configuration requests. Block-based storage service control plane 622 may also provide services related to the creation, usage and deletion of volume snapshots 642 on other storage service 640. Block-based storage service control plane 622 may also provide services related to the collection and processing of performance and auditing data related to the use of data volumes 626 and snapshots 642 of those volumes.

Provider network 600 may also implement another storage service 640, as noted above. Other storage service 640 may provide a same or different type of storage as provided by block-based storage service 620. For example, in some embodiments other storage service 640 may provide an object-based storage service, which may store and manage data as data objects. For example, volume snapshots 642 of various data volumes 626 may be stored as snapshot objects for a particular data volume 626. In addition to other storage service 640, provider network 600 may implement other network-based services 650, which may include various different types of analytical, computational, storage, or other network-based system allowing clients 610, as well as other services of provider network 600 (e.g., block-based storage service 620, virtual compute service 630 and/or other storage service 640) to perform or request various tasks.

Clients 610 may encompass any type of client configurable to submit requests to network provider 600. For example, a given client 610 may include a suitable version of a web browser, or may include a plug-in module or other type of code module configured to execute as an extension to or within an execution environment provided by a web browser. Alternatively, a client 610 may encompass an application such as a database application (or user interface thereof), a media application, an office application or any other application that may make use of compute instances, a data volume 626, or other network-based service in provider network 600 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 610 may be configured to generate network-based services requests according to a Representational State Transfer (REST)-style network-based services architecture, a document- or message-based network-based services architecture, or another suitable network-based services architecture. In some embodiments, a client 610 (e.g., a computational client) may be configured to provide access to a compute instance or data volume 626 in a manner that is transparent to applications implement on the client 610 utilizing computational resources provided by the compute instance or block storage provided by the data volume 626.

Clients 610 may convey network-based services requests to provider network 600 via external network 660. In various embodiments, external network 660 may encompass any suitable combination of networking hardware and protocols necessary to establish network-based communications between clients 610 and provider network 600. For example, a network 660 may generally encompass the various telecommunications networks and service providers that collectively implement the Internet. A network 660 may also include private networks such as local area networks (LANs) or wide area networks (WANs) as well as public or private wireless networks. For example, both a given client 610 and provider network 600 may be respectively provisioned within enterprises having their own internal networks. In such an embodiment, a network 660 may include the hardware (e.g., modems, routers, switches, load balancers, proxy servers, etc.) and software (e.g., protocol stacks, accounting software, firewall/security software, etc.) necessary to establish a networking link between given client 610 and the Internet as well as between the Internet and provider network 600. It is noted that in some embodiments, clients 610 may communicate with provider network 600 using a private network rather than the public Internet.

In some embodiments, a block-based storage service such as that illustrated in FIG. 6 (and its underlying block-based storage system) may allow customers to create storage volumes and attach them to virtualized computing resource instances, including those that implement the compute nodes of a cluster of compute nodes in a distributed computing system. Once such storage volumes are attached, the customer may create a file system on top of these volumes, load them with applications or data, execute a database on them, or in general use them in any way that the customer might use a block device. In some embodiments, the storage volumes may be placed in a specific data center, availability zone, or region, and they may be automatically replicated in order to protect the customer's data from the failure of any single component.

In some embodiments, a service provider may offer multiple types of storage volumes, each type having different features and/or performance characteristics. In some embodiments, a block-based storage service may allow customers to create point-in-time snapshots and to use them to instantiate new volumes. Such snapshot may, for example, be used for geographical expansion, data center migration, and/or disaster recovery. A block-based storage service may also provide access to performance metrics for the storage volumes (such as bandwidth, throughput, latency, and queue depth). These and other metrics may be accessible through an API of a monitoring tool or through a GUI, command line, or other interface for the block-based storage service.

In some embodiments, access to storage volumes in a block-based storage system may be managed in conjunction with accesses to other resources and services offered by a service provider within an identity and access management component (e.g., an identity manager on the service provider network). For example, in some embodiments at least one identity manager (such as identity manager 540 illustrated in FIG. 5) may be implemented within a provider network. The identity manager may enable role-based access control for all resources and services offered by the service provider, and (in at least some embodiments) may be federated with other authentication and access-control technology. Through the identity manager, customers (or client administrators) may be able to specify group and user hierarchies with associated roles and/or capabilities for various applications and/or services. For example, with respect to a content management service, a particular user X may be assigned a "content contributor" role with capabilities such as "add content", "modify content" and so on. The roles and capabilities defined by the identity manager may not be applicable to all of the services available in the provider network, in some embodiments. For example, in some embodiments, the authorization models (e.g., the rules used to decide the types of permissions required to perform various types of operations, the authorization API calls supported, and the way that the permissions are stored and managed) in use may differ from service to service, and the identity manager may be responsible for maintaining user and group roles and capabilities for the various users of various customer accounts.

Figure 7:
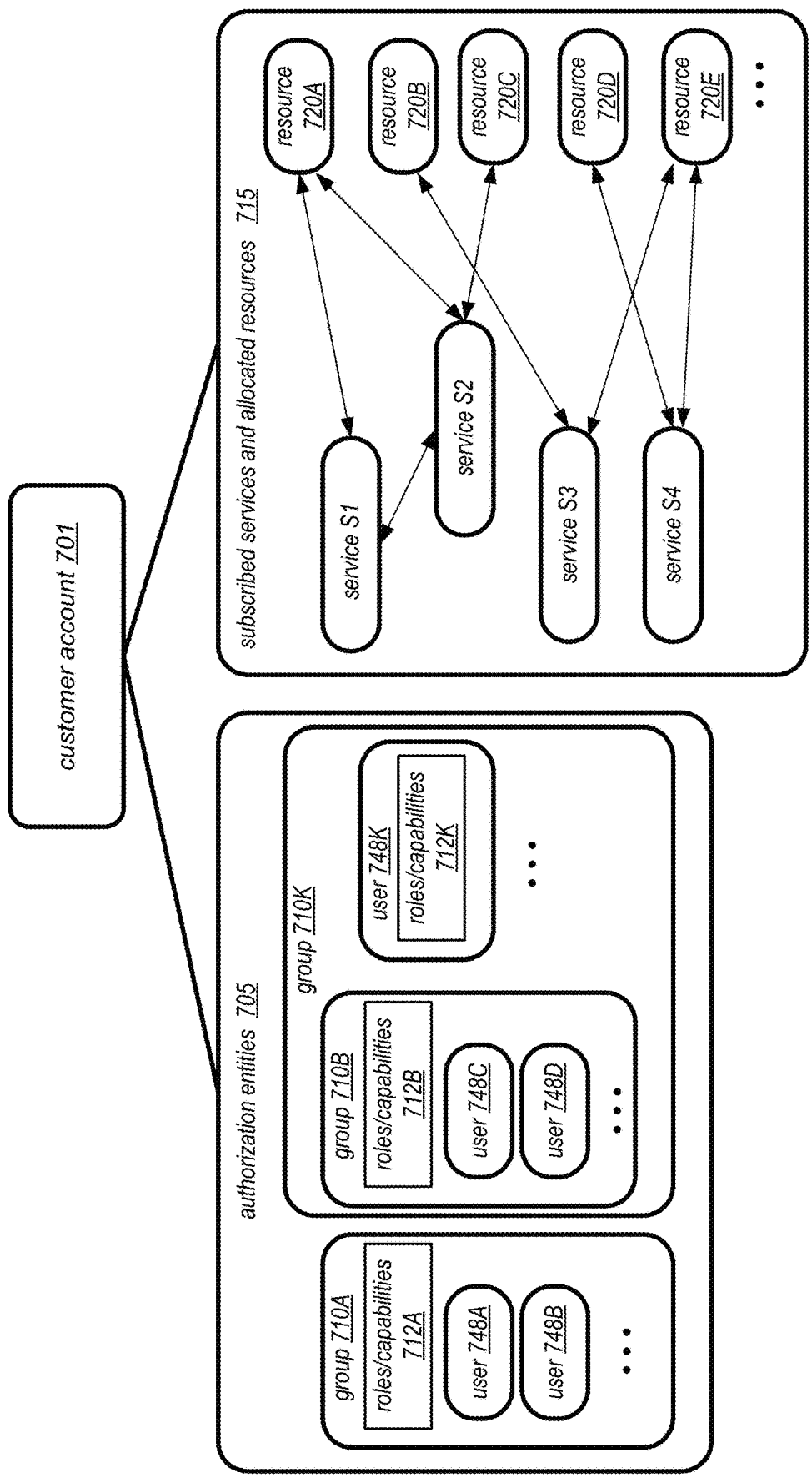
FIG. 7 illustrates examples of the types of metadata that may be used in managing identify and access roles and permissions for users, groups, resources, and services associated with a customer account, according to at least some embodiments.

FIG. 7 illustrates examples of the types of metadata that may be used in managing identify and access roles and permissions for users, groups, resources, and services associated with a customer account (e.g., for a customer of a distributed computing service), according to at least some embodiments. In some embodiments, a given customer account 701 may have multiple users and/or groups affiliated with it. For example, a software development organization with fifty employees may wish to set up respective groups for software developers, quality assurance engineers, and managers. In another example, a customer of (or subscriber to) a distributed computing service that has single customer account may, in turn, provide access to the distributed computing service to its own customers or subscribes. These customers/subscribers of the single customer may include multiple users that may or may not be organized in groups.

In the example illustrated in FIG. 7, each group 710 may include a plurality of users 748. For example, group 710A includes users 748A and 748B, group 710B includes users 748C and 748D, and so on. A given group (such as group 710B) may belong to another group (such as group 710K). Some users may not belong to any group, while others (such as user 748K) may belong to multiple groups. The various groups and/or individual users may be assigned authorization roles and capabilities. For example, group 710A has roles/capabilities 712A, group 710B has roles/capabilities 712B, and user 748K has roles/capabilities 712K. Roles and capabilities 712 may be termed "identity-based" authorization settings or "identity" authorization settings herein, as they are associated with a user/group hierarchy and may be associated with applications rather than with specific resources. For example, users 748 of a quality assurance group 710 may be granted a "qa" role allowing them an "execute" capability for an automated test application. The complete set of identity-based authorization capabilities of a given user may depend on the combination of roles/capabilities of all the groups to which the user belongs, and on any user-specific roles and capabilities granted to that user alone. In some embodiments, the user/group hierarchies for various customer accounts 701 may be managed by an identity service (e.g., a service provided by the distributed computing service provider and implemented by an identity manager (such as identity manager 540 illustrated in FIG. 5). Note that some customer accounts 701 may (at least initially) have just one affiliated user 748, and the number of users 748 and/or groups 710 of a given customer account 701 may change over time.

The users 748 affiliated of a given customer account 701 may have access to a number of different distributed services and/or resources (shown in FIG. 7 as subscribed services and allocated resources 715). For example, each service to which users can subscribe may be implemented using a number of different resources 720 that may be allocated to the users 748 of the customer account 701, and in some cases one service may rely on one or more other services. For example, in FIG. 7, service S1 relies on service S2. Service S1 uses resource 720A directly, and also requires the use of resources 720B and 720C that are used for service S2. Service S4 relies on both resource 720D and 720E. Note that a given resource 720 (such as resource 720E) may be implementing portions of the functionality of several different services (e.g., implementation modules for services S3 and S4 may be resident on resource 720E). In some embodiments, an identity manager may communicate with the respective service managers of various services available in the provider network to determine which services are accessible to users 748 of a given customer account 701. For example, for a given customer account 701, the identity manager may maintain metadata such as the mappings between services, resources 720 (including resources instances of various clusters created under customer account 701), roles and capabilities 712 (including e.g., identity and access management roles, as described herein), and/or the users 748 and groups 710 to which the resources 720 are allocated.

As previously noted, some distributed computing environments and distributed computing system frameworks (including the Apache™ Hadoop® framework) do not provide cluster isolation for clusters that are created for the same customer or under the same customer account. However, some customer accounts may represent customers who are themselves service providers for their own customers, or they may represent other collections of users who access the services provided by a distributed computing system under a single customer account but whose data and resources should (for security and/or for any number of other reasons) be isolated from each other. In some embodiments, the systems described herein may provide data, resource, and/or process isolation for clusters that were created for the same customer or under the same customer account. For example, these systems may provide isolation for any of the resources within a cluster or accessed by the resource instances within a cluster in order to perform jobs on behalf of clients, including virtualized computing resource instances, block-based storage resources (and data or metadata stored thereon) and/or object storage resources (and data or metadata stored thereon). For example, the techniques described herein may prevent the compute nodes of one cluster from communicating with or accessing the compute nodes, data, or resources of another cluster, whether the clusters were created under one customer account or under different customer accounts. In addition, using the techniques described herein, even if some data that is accessed by a particular cluster is stored in storage volumes of a block-based storage service outside of the resource instances within the cluster that access it, no resource instances of another cluster will be able to access that data (or even be aware of its existence), regardless of whether the clusters were created under one customer account or under different customer accounts.

In some embodiments, the systems described herein may employ a combination of integrated techniques in order to provide complete data isolation and also network and process isolation for clusters, even for clusters that were created for the same customer or under the same customer account. For example, these systems may provide network isolation by creating a separate virtual private cloud (VPC) for each cluster (e.g., each cluster may be launched within a different VPC). In addition, each cluster may be created with an identity and access management profile role that defines which of the APIs exposed by the distributed computing system or framework its compute nodes (and underlying resource instance thereof) may perform. The role may only grant permission for these nodes and resource instance to access data that has a unique storage system prefix that was created or specified by the customer (or generated by the system at the request of the customer) and assigned for the cluster, and may not authorize these compute nodes and resource instances to perform other APIs (e.g., APIs that would allow a compute node or resource instance thereof to discover or access resources of another cluster). In other words, such a role may provide instance level isolation for a given cluster. Note that in some embodiments, all of the clusters created on behalf of the same customer or under the same customer account may have the same identity and access management profile role (e.g., one that is unique to the customer), while in other embodiments, each cluster created on behalf of the same customer or under the same customer account may have a different identity and access management profile role (thus allowing for finer grained control over the APIs that are available to each of the clusters).

In some embodiments, the storage system prefix assigned for each cluster may represent a prefix that is included in the keys for each data object stored by the instances of the cluster or on behalf of the cluster or an identifier that is pre-pended to the keys of those objects when they are stored. In such embodiments, the identity and access management profile role may only provide permission to read data stored in association with the storage system prefix (e.g., instances with a given storage service prefix may only access data items in an object data store whose keys include the storage system prefix). In some embodiments, this approach may provide data level isolation in the object data store. Note that the storage system prefix assigned to each cluster may be a storage system prefix that was created or specified by the customer on whose behalf the cluster was created (e.g., when creating the cluster) or that was created by the system at the request of the customer at that time, in different embodiments.

In some embodiments, data isolation may also be provided through the use of instance metadata tags, as described in more detail below. In such embodiments, starting a cluster with a customer-specific or cluster-specific tag value may enable a restriction in the corresponding instance profiles of the resource instances within the cluster such that they can only attach storage volumes in a block-based storage service that have a matching tag value. In some embodiments, this technique may be used to eliminate the possibility of clusters accessing the data of other clusters that is residing in storage volumes within the block-based storage service. In some embodiments, the integrated combination of the isolation techniques described herein may provide network, data and instance level isolation of individual clusters in a distributed computing system, even for clusters that are created for the same customer or under the same customer account. This will enable ISVs to provide proper secure cluster solutions on EMR.

Figure 8:
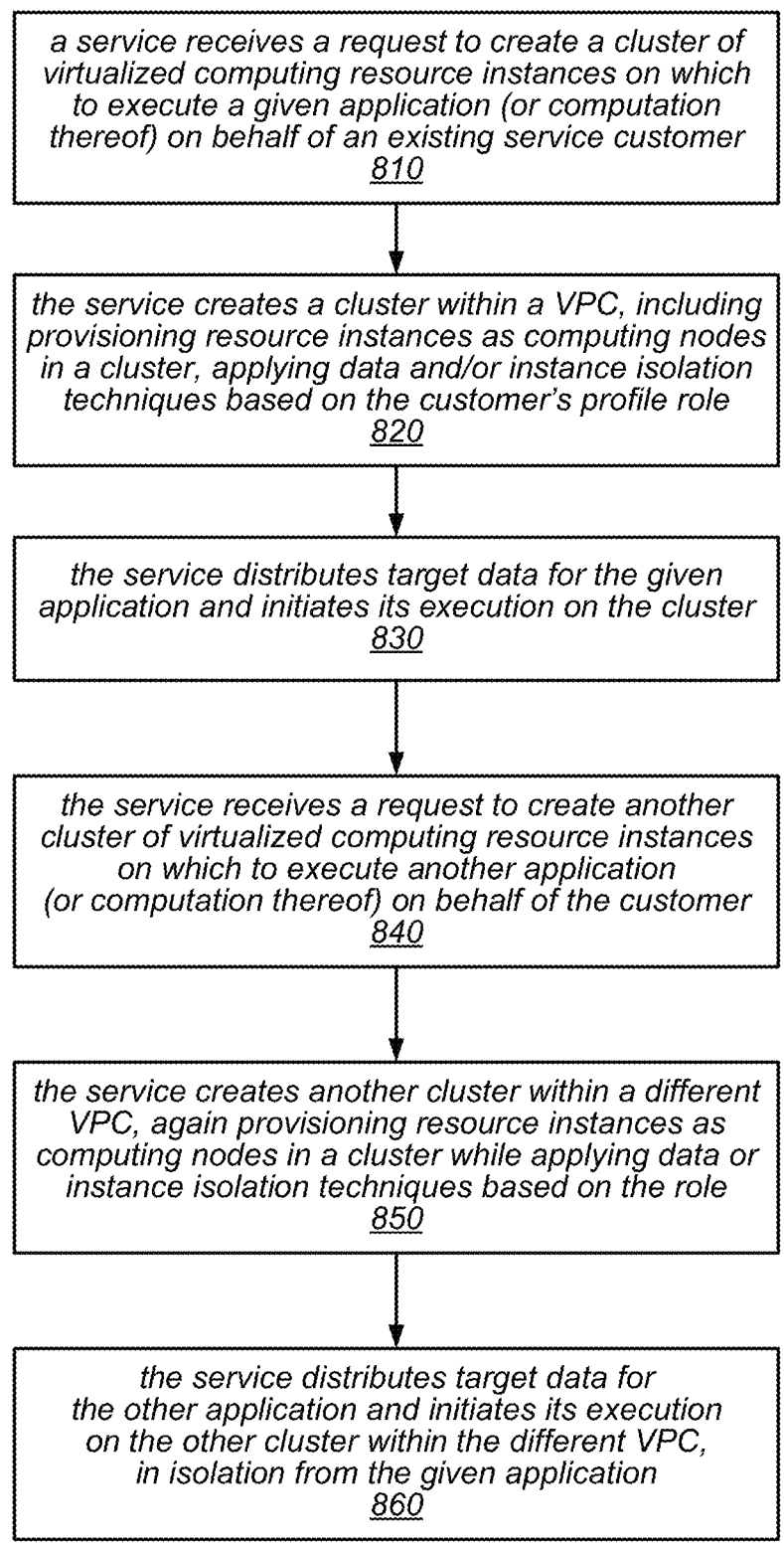
FIG. 8 is a flow diagram illustrating one embodiment of a method for isolating clusters that are created on behalf of the same customer or under a single customer account.

One embodiment of a method for isolating clusters that are created on behalf of the same customer or under a single customer account (e.g., in a distributed computing system on a service provider network) is illustrated by the flow diagram in FIG. 8. As illustrated at 810, in this example, the method may include a service receiving a request to create a cluster of virtualized computing resource instances on which to execute a given application (or computation thereof) on behalf of an existing service customer. For example, in one embodiment, the distributed computing environment may implement a MapReduce architecture, and the request may be for creation of a MapReduce cluster comprising computing nodes on which to execute a high-performing computing application (or computation thereof). In other embodiment, the request may be for creation of a cluster of computing nodes in distributed computing environment that implements a different cluster-based architecture on which such applications may be executed. Note that, in some embodiments, the request may be received from a client (e.g., a client application, through which an end user, service subscriber, or third party service that is a customer of the service may interact with the service) that is associated with a particular customer account. Note also that the service customer, being an existing customer of the service, may have previously created a profile role with the service (or requested that a profile role be created by the service for the customer) to be assigned to its cluster(s).

As described in more detail below, the method may include the service creating a cluster within a VPC, which may include provisioning resource instances as computing nodes in a cluster, while applying one or more data and/or instance isolation techniques based on the customer's profile role (e.g., to prevent other computing nodes from being able to access the data, metadata, and resource instances of the cluster), as in 820. The method may include the service distributing target data for the given application and initiating its execution on the cluster (as in 830). For example, the method may include the service downloading the target data and distributing it to each of the computing nodes of the cluster itself, initiating operations for various nodes to download portions of a target data set, invoking master and worker processes (e.g., mapper and/or reducer processes), or taking other actions to launch and begin executing a distributed application (e.g., a MapReduce job, an MPI job that is run over MapReduce, or another type of job), in different embodiments.

As illustrated in this example, while the application is still executing and/or the first cluster is still operating, the method may include the service receiving a request to create another cluster of virtualized computing resource instances on which to execute another application (or computation thereof) on behalf of the same customer (as in 840). For example, in various embodiments, the request may be received from a client (e.g., a client application, through which an end user, service subscriber, or third party service that is a customer of the service may interact with the service) associated with the particular customer account. In different embodiments, the request may be received from the same client from which the first request was received or from a different client.

As illustrated in FIG. 8, the method may include the service creating another cluster within a different VPC, which may include provisioning other resource instances as computing nodes in a cluster, while again applying one or more data isolation or instance isolation techniques such as those described herein, based on the customer's profile role (as in 850). For example, the clusters may be isolated such that the instances that execute the two applications are not aware of each other and cannot access each other's resource instances, input (target) data, metadata, or output data (results). The method may also include the service distributing target data for the other application and initiating its execution on the other cluster within the different VPC, in isolation from the given application (as in 860). In various embodiments, this may include the service downloading the target data for the second application and distributing it to each of the computing nodes of the cluster itself, initiating operations for various nodes to download portions of a target data set, invoking master and worker processes (e.g., mapper and/reducer processes), or taking other actions to launch and begin executing a second distributed application (e.g., a MapReduce job, an MPI job that is run over MapReduce, or another type of job). Note that the operations illustrated in FIG. 8 may be repeated each time a request is made to create a cluster on behalf of the same customer or under the same customer account, such that any number of clusters may, at different times, be operating to execute applications and/or computations in isolation from each other.

In some embodiments, creating and operating a MapReduce cluster within a VPC may provide network isolation for the cluster such that no external traffic can access any of the data or resource instances in the cluster. In other words, unlike in a standard framework that supports MapReduce (e.g., one in which any node can join as a worker node and log into the master node if it is aware of the resource instances and/or the IP addresses of the compute nodes they implement), entities outside of the cluster may not be able to join with, access, or communicate with entities within the VPC, even if they are aware of them. As described in more detail below, other mechanisms (e.g., identity and access management roles, cluster-specific prefixes for those role, and/or cluster-specific and/or customer-specific tags) may be used to prevent entities outside of the cluster from even being aware of the data and resources instances within the VPC, in some embodiments.

In some embodiments, the systems described herein may implement identity and access management mechanisms (e.g., within an identity and access management component, such as identity manager 540 illustrated in FIG. 5) that enable customers to securely control access to services and resources for their users. Using these mechanisms, a customer (e.g., a service subscriber) may create and manage individual users and groups and use permissions to allow and deny their access to resources and services provided by the service provider. For example, through various combinations of identity and access management roles and customer-specific and/or cluster-specific tags, a customer may control whether their users (e.g., others in their organizations and/or customers of the customer that is a service subscriber) may perform a task using specific API actions exposed by the service and/or whether they can use specific resources implemented by the service.

More specifically, in some embodiments of the systems described herein, these identity and access management mechanisms may allow customers to create users in the identity manager, assign them individual security credentials (i.e., access keys, passwords, and/or multi-factor authentication devices), request temporary security credentials to provide users access to services and resources, and/or manage permissions in order to control which operations a user can perform. In addition, they may allow customers to create roles in the identity manager, manage permissions to control which operations can be performed by an entity, or service, that assumes the role, and/or define which entities are is allowed to assume the role. In some embodiments, the identity and access management mechanisms may allow the users to control access to service APIs and to specific resources. They may also enables customers to add specific conditions to control if, when, or how a user can use the services, such as time of day, their originating IP address, whether they are using SSL, or whether they have authenticated with a multi-factor authentication device.

In some embodiments, the identity and access management mechanisms may allow customers to temporarily delegate access to users or services that normally do not have access to specific resources. For example, an application running on a virtualized computing resource instance within a cluster may need to make requests for resources that are outside of the resource instance (e.g., to access data in a data store that is outside of the resource instance). In such embodiments, the customer may delegate access to various resources using identity and access management roles (sometimes referred to herein as "profile roles", or simply "roles"). A role is a mechanism by which a customer may define a set of permissions to access the resources that a user or service needs, but the permissions are not attached to a particular user or group (as defined in the identity manager). Instead, at run time, applications or services may programmatically assume a role. When a role is assumed, the service may return temporary security credentials that the user or application can use to make programmatic requests to the service. Consequently, customers may not need to share long-term security credentials (for example, by creating a user in the identity manager) for each entity that requires access to a resource. In some embodiments, a customer may create a role in the customer's account that contains the resources that the customer wants to allow access to (by its users). Creating the role may include specifying two policies. For example, a trust policy may specify who is allowed to assume the role (the trusted entity, or principal), while an access (or permissions) policy may define what actions and resources the principal is allowed access to. The principal may be an account at the service provider, service provided by the service provider, or an identity provider, in different embodiments.

In some embodiments of the systems described herein, limited permissions may be given to the roles that are given to the compute nodes of a distributing computing system (e.g., a MapReduce cluster), i.e., the roles by which such clusters are launched. For example, in some embodiments, these nodes may not be able to perform any APIs that would allow them to access, or even be aware of, nodes (or resources instances thereof) in other clusters (such as "describe instance", "describe volume" or "list instances" APIs, or similar), even if those clusters were created under the same customer account. In addition, they may not be not be able to perform any APIs that would allow them to access, or even be aware of, data or metadata maintained in a data store at the service provider on behalf of other clusters (whether or not they are stored within the resource instances of those other clusters). Instead, they may only have permission to read from data or metadata stored in association with unique storage system prefix for their own cluster. In other words, each role may only be allowed to download data or metadata dependent on its unique storage system prefix under the common customer account. Therefore, the resources instances of one cluster that was created under a particular customer account may not be able to obtain the instance identifiers or IP addresses of resource instances of a different cluster that was created under the same customer account, much less log into another instance ID.

In general, identity and access management roles (profile roles) may be used by customers to define which APIs are available for any given resource instance, and may allow only those nodes that have the correct setting in their profile role to have the storage system prefix needed to access the data for a particular cluster. In some embodiments, separate and distinct (different) storage system prefixes may be created for each customer cluster to control access to its data and metadata. For example, in the case of an MPI job running on a MapReduce cluster, in order for a compute node to download and install its cluster-specific key pair, it must have the correct storage system prefix for the cluster (e.g., a prefix that is included in the key used to obtain data and metadata that was stored by or for the cluster, including the cluster-specific key pair, from the storage system or that is otherwise associated with the cluster-specific key pair in the storage system). In general, in at least some embodiments, the use of cluster-specific storage system prefixes to control access to stored data and metadata (in addition to a role associated with the customer account under which each cluster was created) may prevent different customers (and/or their customers and users) from accessing (or being aware of) data that is stored on behalf of another customer (and/or the other customer's customers and users).

Figure 9:
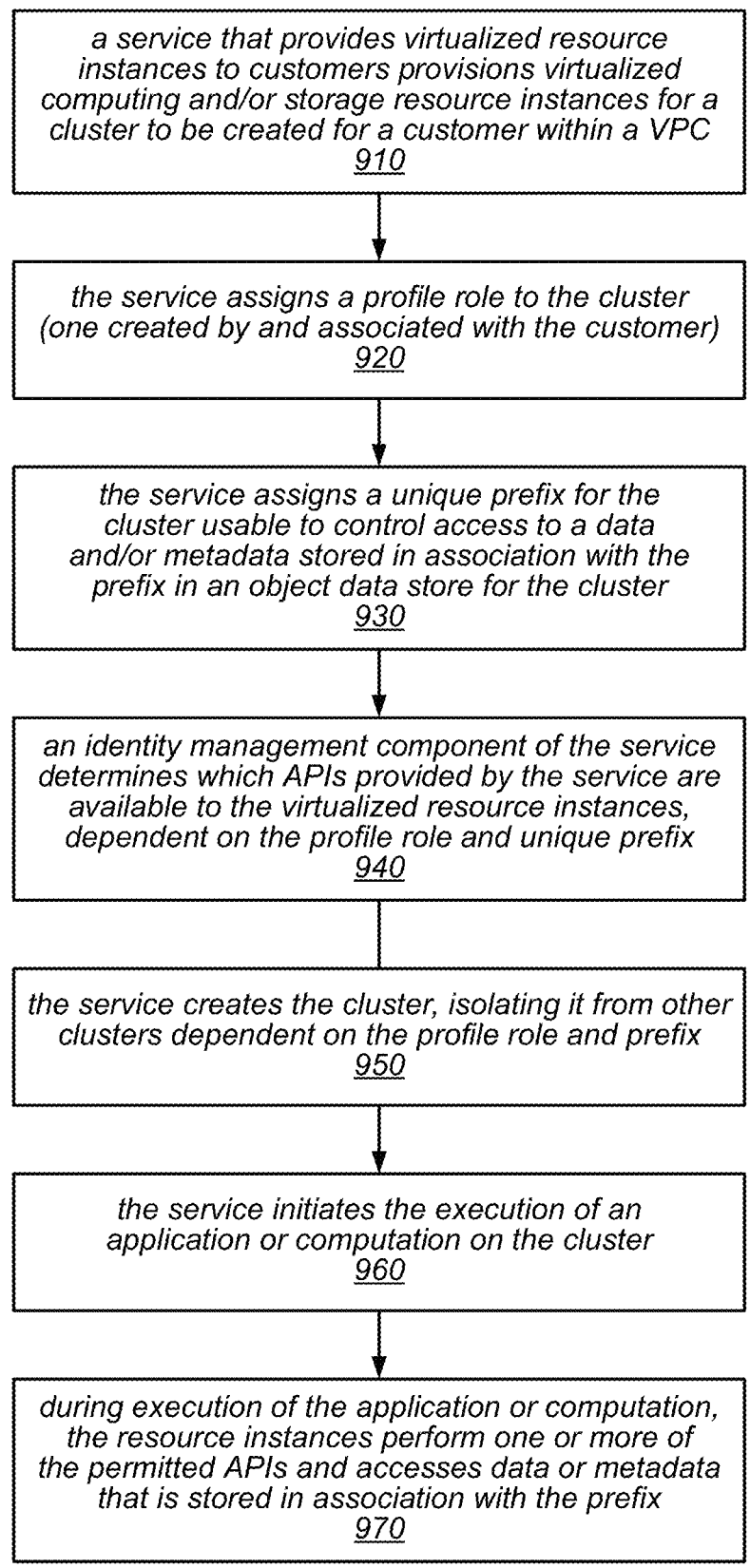
FIG. 9 is a flow diagram illustrating one embodiment of a method for creating an isolated cluster in a distributed computing environment.

One embodiment of a method for creating an isolated cluster in a distributed computing environment is illustrated by the flow diagram in FIG. 9. As illustrated at 910, in this example, the method may include a service that provides virtualized resource instances to customers provisioning virtualized computing and/or storage resource instances for a cluster to be created for a customer within a VPC (e.g., in response to a request such as described in element 810 of FIG. 8). As described herein, the method may include the service assigning a profile role to the cluster that was previously created by the customer (or at the request of the customer) and that is associated with the customer (as in 920). The method may also include the service assigning a unique storage system prefix for the cluster (e.g., one that was created by the customer at the time of the request to create the cluster) that is usable for (among other things) controlling access to a data and/or metadata stored in association with the prefix in an object data store for the cluster (e.g., in the keys used to retrieve them from the storage system), as in 930.

As illustrated in this example, the method may include an identity management component of the service determining which APIs provided by the service are available to the virtualized resource instances, dependent on the profile role and unique cluster-specific storage system prefix (e.g., which APIs they are permitted to perform), as in 940. The method may also include the service creating the cluster, which may include isolating it from other clusters of compute nodes in the distributed computing system of the service provider, dependent on the profile role and storage system prefix. The method may also include the service initiating the execution of an application or computation on the cluster, as in 960. As illustrated in FIG. 9, during execution of the application or computation, the method may include the resource instances performing one or more of the permitted APIs and accessing data or metadata that is stored in association with the storage system prefix, as in 970. In other words, any process executing on the cluster may only perform the determined APIs (according to its role and prefix) and may have access only to data and metadata stored in the object data store in association with the storage system prefix, as described herein.

In some embodiments of the systems described herein, in order to assist customers in managing their resources instances, customers may be able to assign their own metadata to each of their resources in the form of instance metadata tags (sometimes referred to herein simply as "tags"). For example, these tags may enable customers to categorize their resources in different ways, such as by purpose, owner, or environment. Each tag may consist of a key and a value, both of which may be defined by the customer. In some cases, these tags may be interpreted by the service provider system merely as a string of characters. However, as described below, in some embodiments, they may be used as metadata for building a resource-based permission model. In some embodiments, tags are not automatically assigned to resources.

In various embodiments, customers may create tags and assign them to its resources (e.g., to its virtualized computing and storage resource instances) through a through a GUI, command line interface, script, API, or another interface mechanism. In some embodiments, tags may be assigned only to resources that already exist. In one example, through a GUI (e.g., a console of a service), a user can access a list of tags to add to an instance, which may be applied immediately after the instance is created. In some embodiments, if a tag is added that has the same key as an existing tag on that resource, the new value may overwrite the old value. A customer may be able to edit tag keys and values, set a tag's value to the empty string, or remove tags from a resource at any time. In embodiments that implement an identity and access manager (such as identity manager 540 illustrated in FIG. 5), the customer may control which users in the customer account have permission to create, edit, or delete tags.

In some embodiments, if an application requires more storage space (e.g., disk space) than what is available in the resource instances of the cluster on which it is running, the available storage space may be expanded by attaching one or more storage volumes to increase the storage capacity of the cluster. In some embodiments, if the system supports a checkpointing and restarting mechanism for executing applications (e.g., as a feature to support fault tolerance), checkpoint data may be stored in one or more attached storage volumes. In such embodiments, when an executing application needs to be restarted from checkpoint data, the checkpoint data may be readily obtained from the attached storage volume(s) and execution may quickly resume. For example, in an embodiment in which there are four resource instances integrated together within a cluster, if one of them fails (and because the checkpoint data is well isolated, using the techniques described herein), when a new resource instance is brought up, the same volume(s) may be attached and the job may continue. In another example, a customer may wish to attach one or more storage volumes to a cluster that was created under their account for storing their own data (e.g., data that may be unrelated to any jobs executing on the cluster).

In some embodiments of the systems described herein, in order to support these and other use cases for attaching storage volumes to a distributed computing system cluster, the system may employ a restricted tag-based resource permission model. In such embodiments, if one or more storage volumes that are outside the resource instances of a cluster are attached to the cluster, a unique (e.g., customer-specific or cluster-specific) tag (such as one of the instance metadata tags described above) may be assigned to those storage volumes. In such embodiments, only instances that are tagged with that instance metadata tag can attach a storage volume having the same tag. In some embodiments, when a distributed computing system cluster (e.g., a MapReduce cluster) is created, a unique (e.g., customer-specific or cluster-specific) tag may be pushed to the compute nodes created by the cluster (e.g., to the underlying virtualized resource instance thereof). In embodiments in which a cluster is created that is to have access to one or more storage volumes that are outside of its resource instances, this tag may also be pushed to those storage volumes. Subsequently (i.e., once the cluster is created), the tag may be attached to the storage volumes and no resources instances in other customers' clusters may be able to attach (or otherwise access) those storage volumes. For example, if a resource instance in other customers' cluster attempts to access one of the tagged storage volumes through an "attach volumes" API, the API may return an indication of an error condition (e.g., "permission denied"). Similarly, if a resource instance in other customers' cluster directs a "detach volumes" API to one of the tagged storage volumes, the API may return an indication of an error condition (e.g., "permission denied"). In some embodiments, such instance metadata tags may be created by the service on behalf of its customers, and those customers may not even be aware of their existence or their use in managing storage volumes on their behalf. In other words, the service that creates clusters on behalf of its customers may itself be a customer of a storage service that provides access to storage volumes, and the service may initiate and/or manage the attachment of various storage volumes to the clusters it creates in a manner that is transparent to its customers.

Figure 10:
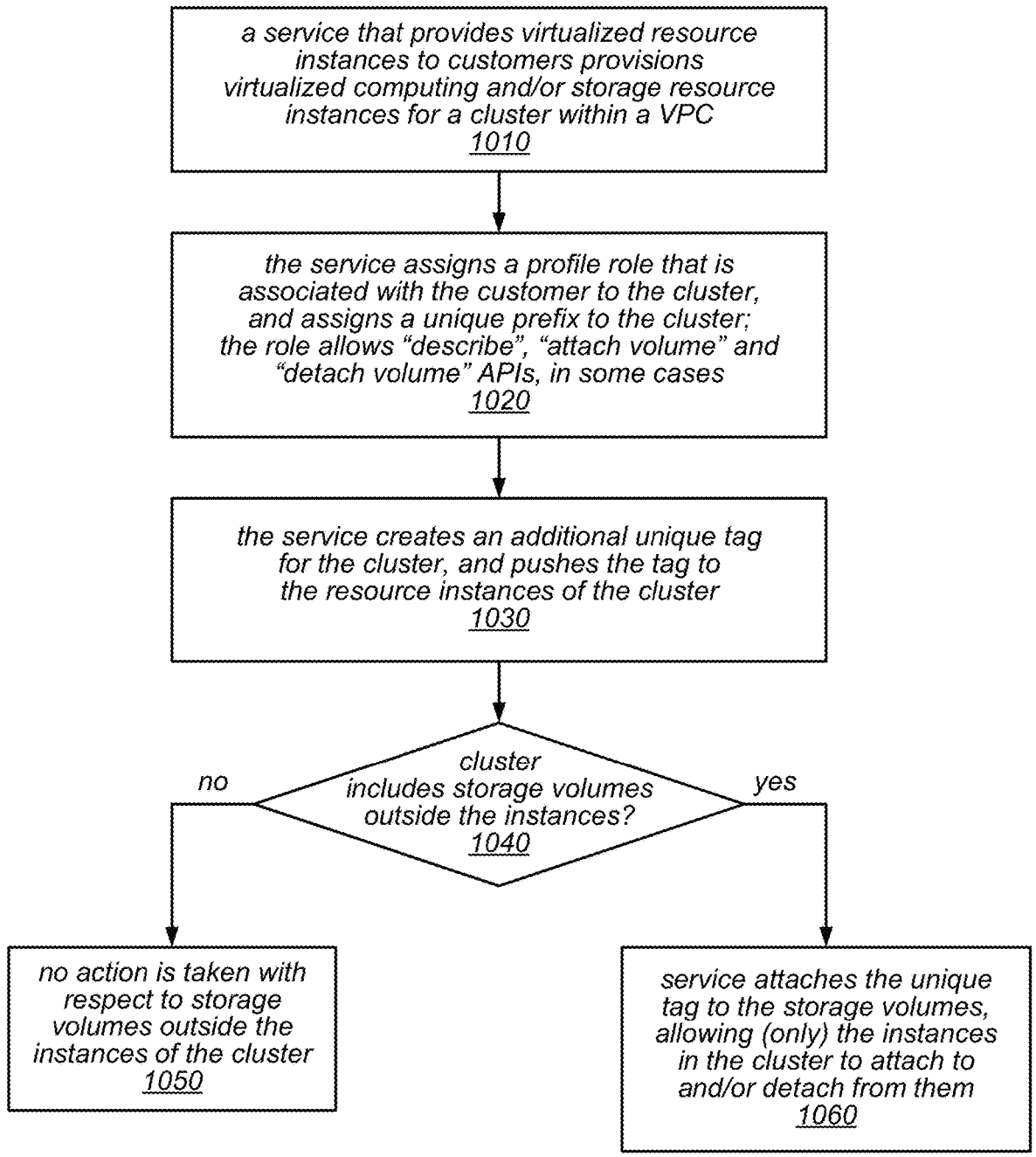
FIG. 10 is a flow diagram illustrating one embodiment of a method for creating an isolated cluster that includes storage volumes outside of the resource instances of the cluster.

One embodiment of a method for creating an isolated cluster that includes storage volumes outside of the resource instances of the cluster is illustrated by the flow diagram in FIG. 10. As in the previously example, the method may include provisioning virtualized resource instances for a cluster and assigning a profile role and unique storage system prefix for the cluster. More specifically, the method may include a service that provides virtualized resource instances to customers provisioning virtualized computing and/or storage resource instances for a cluster within a VPC (as in 1010). The method may also include the service assigning a profile role that is associated with the customer to the cluster (e.g., a profile role that was created by the customer or at the request of the customer when the customer established itself as a customer of and/or subscriber to the service), and assigning a unique storage system prefix for the cluster (e.g., one created or specified by the customer when requesting the creation of the cluster). As illustrated in 1020, in this example, the profile role may allow "describe", "attach volume" and "detach volume" APIs (and only these APIs) to be performed by instances having this profile role, in some cases (as described in more detail below). The storage system prefix may allow instances in the cluster to retrieve data that is stored in association with the storage system prefix (e.g., in an object data store).

As illustrated in this example, the method may also include the service creating an additional unique tag for the cluster (e.g., an instance metadata tag), and pushing this tag to the resource instances of the cluster (as in 1030). If the cluster does not include storage volumes that are outside of the resource instances or have access to any such storage volumes (shown as the negative exit from 1040), there may be no action taken with respect to any storage volumes outside the instances of the cluster (as in 1050). However, if the cluster includes storage volumes outside the instances (e.g., if storage for the cluster is extended to include one or more storage volumes in a block-based storage system such as that illustrated in FIG. 6), the method may include the service attaching the unique tag to the storage volumes, allowing (only) the instances in the cluster to attach to and/or detach from them. This is illustrated in FIG. 10 by the positive exit from 1040 and element 1060. In this example, any other instances that try to attach to these volumes may receive an indication of an error (e.g., "permission denied").

As previously noted, in some embodiments, a customer of a service provider that provides access to virtualized computing resource instances in a distributed computing system may, in turn, provide third party services to others (e.g., to their own customers or subscribers) and may provide identity and access management for clusters of computing nodes (and their underlying virtualized resource instances) on their behalf. For example, the customer may implement an additional layer on top of a MapReduce service (or a service that creates clusters of computing nodes in distributed computing environment that implements a different cluster-based architecture on which applications may be executed) and may interact with the MapReduce service (or other cluster-based distributed computing service) on behalf of subscribers to the third party services they provide. In various embodiments, the techniques described herein for isolating clusters that are created on behalf of the same customer or under the same customer account may be implemented in distributed computing environments that support such third party services.

Figure 11:
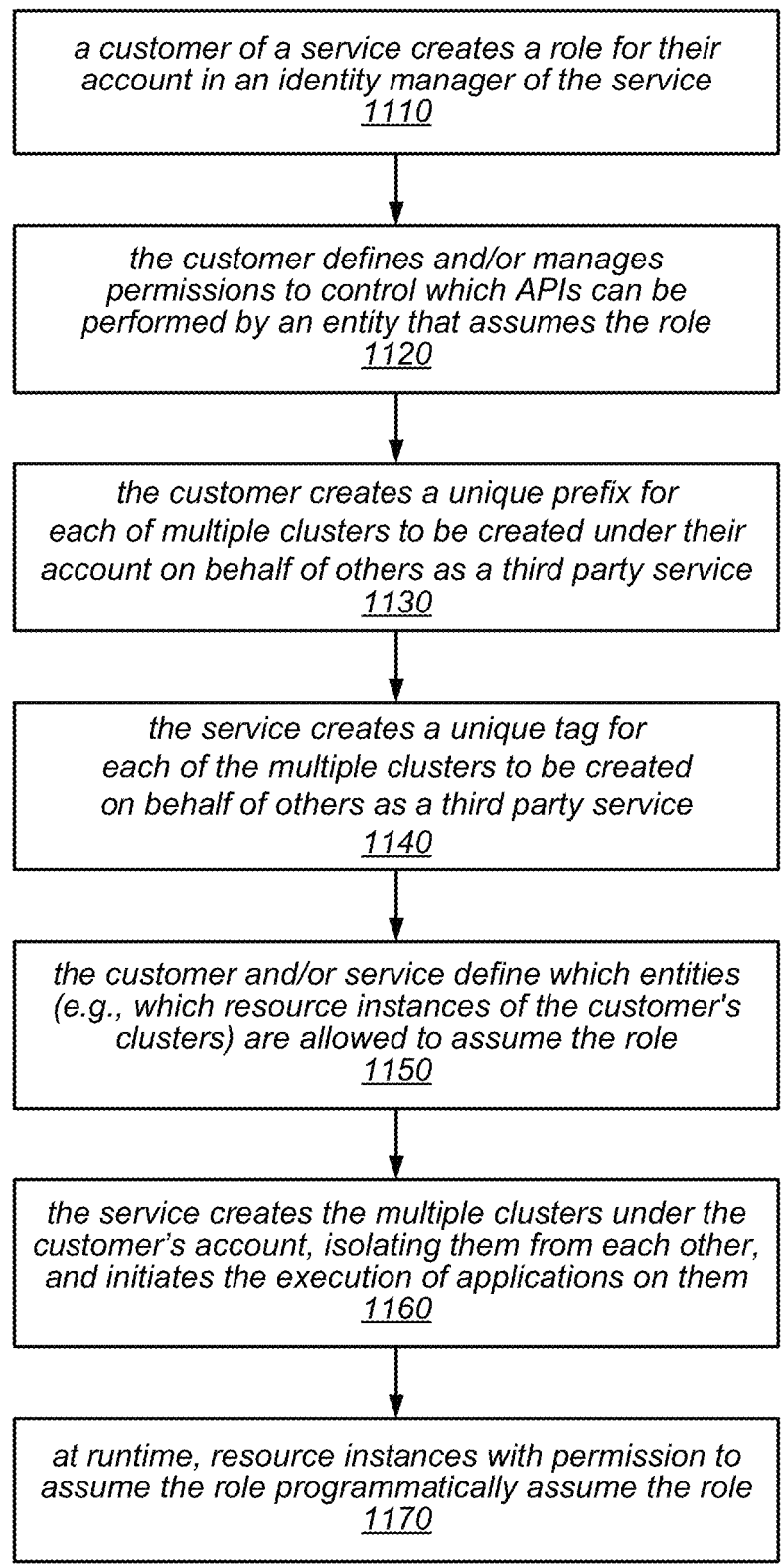
FIG. 11 is a flow diagram illustrating one embodiment of a method for performing identity and access management for isolated clusters that are created on behalf of the same customer or under a single customer account by a third party service.

One embodiment of a method for performing identity and access management for isolated clusters that are created on behalf of the same customer or under a single customer account by a third party service is illustrated by the flow diagram in FIG. 11. As illustrated at 1110, in this example, the method may include a customer of a service (e.g., a customer that provides third party services to others) creating a role for their account in an identity manager of the service (e.g., an identity and access management component of the service). The method may also include the customer defining and/or managing permissions to control which APIs can be performed by an entity that assumes the role (as in 1120). Note that in some embodiments, a customer that provides third party services to others may create different roles for at least some of the clusters it creates on behalf of subscribed to the third party services (e.g., cluster-specific or subscriber-specific roles), while in others, a single profile role may be created for the customer for all of the clusters it creates on behalf of subscribed to the third party services. The method may include the customer creating a unique storage system prefix for each of multiple clusters to be created under their account on behalf of others as a third party service provided by the customer (as in 1130). The method may also include the service creating a unique cluster-specific and/or customer-specific tag for each of the multiple clusters to be created on behalf of others as a third party service provided by the customer (as in 1140). For example, the tag assigned to each cluster may be unique among tags assigned to clusters created under the same customer account, or it may be unique among tags assigned to clusters created under all customer accounts in the distributed computing system of the service provider, in different embodiments. As illustrated in this example, the methods may include the customer or service defining which entities (e.g., which users, services, or resource instances of the client's clusters) are allowed to assume the role (as in 1150)

As illustrated in this example, once various parameters of the clusters have been specified, created, and/or assigned, the method may include the service creating the multiple clusters under the customer's account, isolating them from each other, and initiating to the execution of applications on them, as in 1160. As illustrated in FIG. 11, at runtime (e.g., during initialization of each cluster for execution of a parallel application or computation on the cluster), the method may include the resource instances with permission to assume the role programmatically assuming the role, as in 1170. As described herein, the unique storage system prefix for each of the clusters and/or the unique cluster-specific and/or customer-specific tag assigned to each of the clusters may be used in controlling access to resources outside of the instances of the cluster, such as storage volumes in a block-based storage system, as described above. Note that the operations illustrated in FIG. 11 may not necessarily be performed in the order depicted. For example, while the customer may initiate the creation and configuration of multiple clusters on behalf of others as a third party service, each of the operations performed by the customer to initiate the creation and configuration of each cluster may not take place at the same time for all of the clusters, but may be performed at different times for each of the clusters, with the cumulative result of having created and configured all of the multiple clusters for operation in isolation from each other over some period of time.

In some embodiments of the systems described herein, a distributed computing system that provides storage and computing services to customers may expose an API that explicitly allows a customer to indicate that an isolated cluster should be created (e.g., one in which some or all of the techniques described herein isolating clusters are to be applied). For example, the service may expose a "create isolated cluster" API for use in such cases, in addition to exposing an API for creating clusters that may or may not be isolate from other cluster (e.g., a "create standard cluster" API). In another example, a "create cluster" API may be exposed for which a parameter or switch may be set to indicate whether or not these isolation techniques should be applied when creating a cluster for a particular customer or that under a particular customer account. In some such embodiments, if a cluster is created without the application of these techniques, the amount of isolation provided for clusters (e.g., those created for the same customer or under the same customer account and those created for different customers or under different customer accounts) may be dependent on the architecture of the system, various default or configurable parameter setting, and/or various system-wide, application-specific, or customer-specified isolation policies In some embodiments, the isolation techniques describe herein may be applied automatically by the service provider when creating all clusters (e.g., those created for the same customer or under the same customer account and for those created for different customers or under different customer accounts).

In at least some embodiments, the data store described herein may be an implementation of the Hadoop® FileSystem API built on an unstructured object storage service. Note also that while many embodiments of techniques for creating isolated clusters in a distributed computing system are described in terms of specific implementations of MapReduce systems and services built on the Apache™ Hadoop® framework, these techniques may be applied in order to create isolated clusters on other implementations of MapReduce or in other types of cluster-based distributed computing frameworks, some (but not all) of which may include master compute nodes and worker (i.e., slave) compute nodes, in other embodiments. In various embodiments, the integrated combination of the isolation mechanisms described herein (e.g., mechanisms for creating separate VPCs for each cluster, for using identity and access management roles and/or storage system prefixes to restrict the APIs that each resource instance of a cluster can perform and/or the data it can retrieve from an object data store, and/or for creating instance metadata tags to restrict storage volume attachment) may provide isolation for clusters (even those created by the same customer or under the same customer account) in any type of cluster-based distributed computing environment that provides storage and computing services to clients. For example, they may provide network isolation, object-level data isolation (in an object data store), volume-level data isolation (e.g., in a block-based storage system), and instance level isolation (process isolation).

In some embodiments, at least some of the metadata, data items and/or objects described herein may be stored on Solid State Drives (SSDs). In some embodiments, at least some of the metadata, data items and/or objects may be replicated, for example across three locations, for high availability and durability.

Example Provider Network Environments

This section describes example provider network environments in which embodiments of the methods and apparatus described herein (e.g., those employed in executing applications on a MapReduce cluster) may be implemented. However, these example provider network environments are not intended to be limiting.

Figure 12:
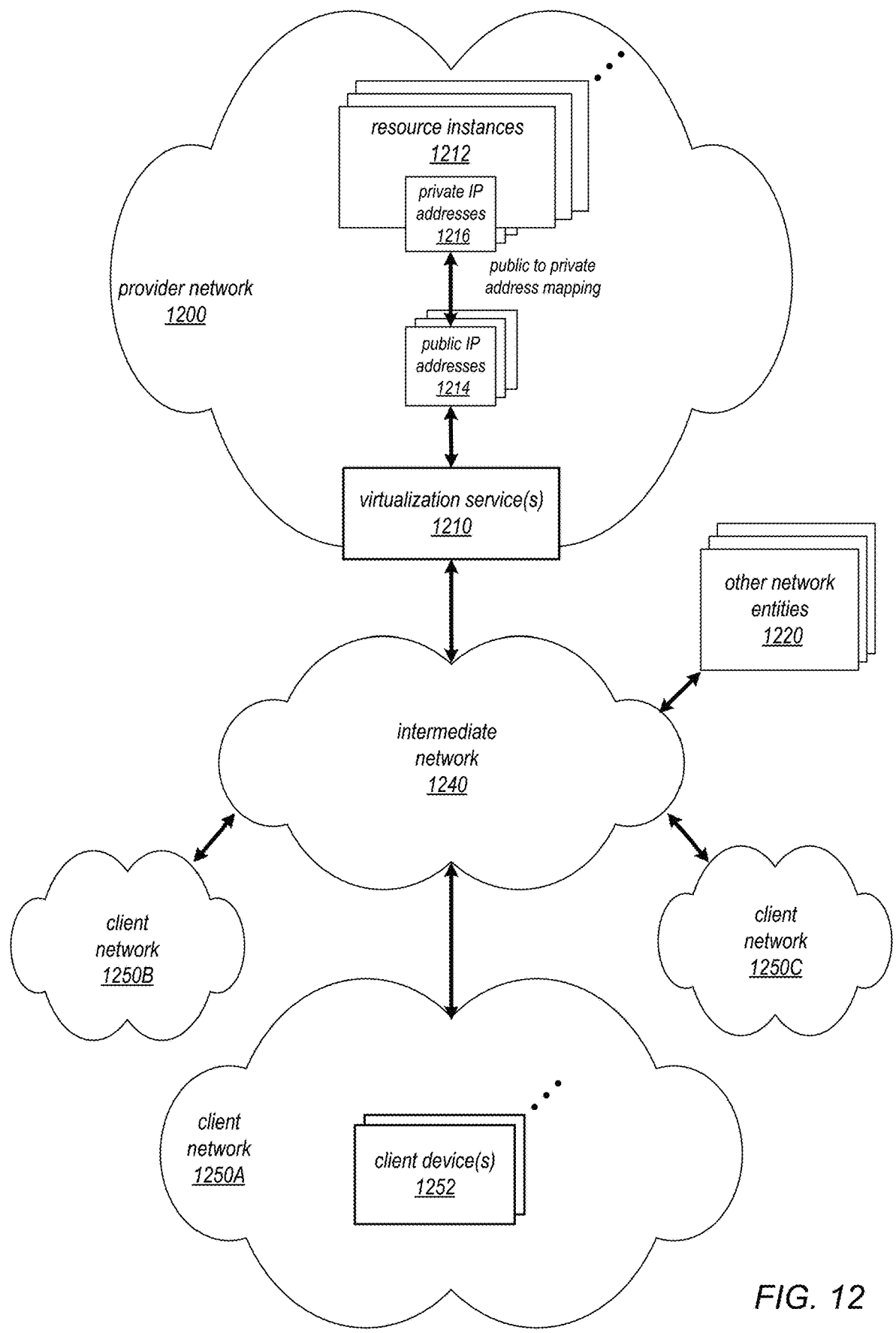
FIG. 12 illustrates an example provider network environment, according to at least some embodiments.

FIG. 12 illustrates an example provider network environment, according to at least some embodiments. A provider network 1200 may provide resource virtualization to clients via one or more virtualization services 1210 that allow clients to purchase, rent, or otherwise obtain instances 1212 of virtualized resources, including but not limited to computation and storage resources, implemented on devices within the provider network or networks in one or more data centers. Private IP addresses 1216 may be associated with the resource instances 1212; the private IP addresses are the internal network addresses of the resource instances 1212 on the provider network 1200. In some embodiments, the provider network 1200 may also provide public IP addresses 1214 and/or public IP address ranges (e.g., Internet Protocol version 4 (IPv4) or Internet Protocol version 6 (IPv6) addresses) that clients may obtain from the provider 1200.

Conventionally, the provider network 1200, via the virtualization services 1210, may allow a client of the service provider (e.g., a client that operates client network 1250A) to dynamically associate at least some public IP addresses 1214 assigned or allocated to the client with particular resource instances 1212 assigned to the client. The provider network 1200 may also allow the client to remap a public IP address 1214, previously mapped to one virtualized computing resource instance 1212 allocated to the client, to another virtualized computing resource instance 1212 that is also allocated to the client. Using the virtualized computing resource instances 1212 and public IP addresses 1214 provided by the service provider, a client of the service provider such as the operator of client network 1250A may, for example, implement client-specific applications and present the client's applications on an intermediate network 1240, such as the Internet. Other network entities 1220 on the intermediate network 1240 may then generate traffic to a destination public IP address 1214 published by the client network 1250A; the traffic is routed to the service provider data center, and at the data center is routed, via a network substrate, to the private IP address 1216 of the virtualized computing resource instance 1212 currently mapped to the destination public IP address 1214. Similarly, response traffic from the virtualized computing resource instance 1212 may be routed via the network substrate back onto the intermediate network 1240 to the source entity 1220.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients (e.g., client applications through which end users, service subscribers or third party services that are customers of the service interact with the service) of the provider network 1200; a client may then assign their allocated public IP addresses to particular resource instances allocated to the client. These public IP addresses may be referred to as client public IP addresses, or simply client IP addresses. Instead of being assigned by the provider network 1200 to resource instances as in the case of standard IP addresses, client IP addresses may be assigned to resource instances by the clients, for example via an API provided by the service provider. Unlike standard IP addresses, client IP Addresses are allocated to client accounts (e.g., customer accounts) and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 13:
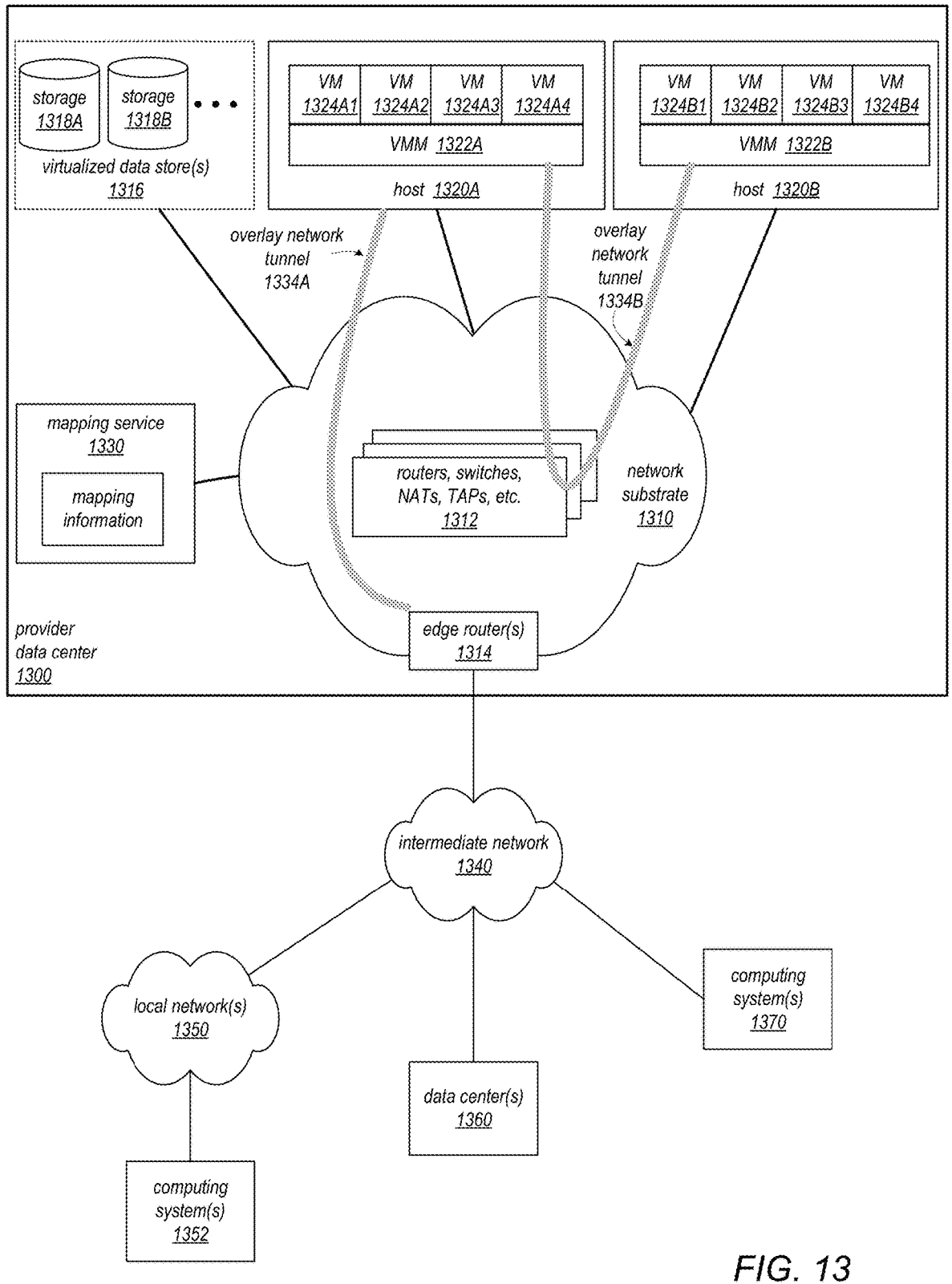
FIG. 13 illustrates an example data center that implements an overlay network on a network substrate using IP tunneling technology, according to some embodiments.

FIG. 13 illustrates an example data center that implements an overlay network on a network substrate using IP tunneling technology, according to at least some embodiments. A provider data center 1300 may include a network substrate that includes networking devices 1312 such as routers, switches, network address translators (NATs), and so on. At least some embodiments may employ an Internet Protocol (IP) tunneling technology to provide an overlay network via which encapsulated packets may be passed through network substrate 1310 using tunnels. The IP tunneling technology may provide a mapping and encapsulating system for creating an overlay network on a network (e.g., a local network in data center 1300 of FIG. 13) and may provide a separate namespace for the overlay layer (the public IP addresses) and the network substrate 1310 layer (the private IP addresses). Packets in the overlay layer may be checked against a mapping directory (e.g., provided by mapping service 1330) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1330) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 13, an example overlay network tunnel 1334A from a virtual machine (VM) 1324A on host 1320A to a device on the intermediate network 1340 (through edge router 1314) and an example overlay network tunnel 1334B between a VM 1324B on host 1320B and a VM 1324C on host 1320C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses. In some embodiments, an IP tunneling technology such as that illustrated in FIG. 13 may be employed when passing messages between processes of an MPI application executing on a MapReduce cluster.

Referring to FIG. 13, at least some networks in which embodiments may be implemented may include hardware virtualization technology that enables multiple operating systems to run concurrently on a host computer (e.g., hosts 1320A and 1320B of FIG. 13), i.e. as virtual machines (VMs) 1324 on the hosts 1320. The VMs 1324 may, for example, be rented or leased to clients of a network provider. A hypervisor, or virtual machine monitor (VMM) 1322, on a host 1320 presents the VMs 1324 on the host with a virtual platform and monitors the execution of the VMs 1324. Each VM 1324 may be provided with one or more private IP addresses; the VMM 1322 on a host 1320 may be aware of the private IP addresses of the VMs 1324 on the host. A mapping service 1330 may be aware of all network IP prefixes and the IP addresses of routers or other devices serving IP addresses on the local network. This includes the IP addresses of the VMMs 1322 serving multiple VMs 1324. The mapping service 1330 may be centralized, for example on a server system, or alternatively may be distributed among two or more server systems or other devices on the network. A network may, for example, use the mapping service technology and IP tunneling technology to, for example, route data packets between VMs 1324 on different hosts 1320 within the data center 1300 network; note that an interior gateway protocol (IGP) may be used to exchange routing information within such a local network.

In addition, a network such as the provider data center 1300 network (which is sometimes referred to as an autonomous system (AS)) may use the mapping service technology, IP tunneling technology, and routing service technology to route packets from the VMs 1324 to Internet destinations, and from Internet sources to the VMs 1324. Note that an external gateway protocol (EGP) or border gateway protocol (BGP) is typically used for Internet routing between sources and destinations on the Internet. FIG. 13 shows an example provider data center 1300 implementing a network that provides resource virtualization technology and that provides full Internet access via edge router(s) 1314 that connect to Internet transit providers, according to at least some embodiments. The provider data center 1300 may, for example, provide clients the ability to implement virtual computing systems (VMs 1324) via a hardware virtualization service and the ability to implement virtualized data stores 1316 on storage resources 1318 via a storage virtualization service. Note that, in various embodiments, storage 1318 of virtualized data store 1316 may include object storage, block-based storage, and/or volume-based storage, as described herein.

The data center 1300 network may implement IP tunneling technology, mapping service technology, and a routing service technology to route traffic to and from virtualized resources, for example to route packets from the VMs 1324 on hosts 1320 in data center 1300 to Internet destinations, and from Internet sources to the VMs 1324. Internet sources and destinations may, for example, include computing systems 1370 connected to the intermediate network 1340 and computing systems 1352 connected to local networks 1350 that connect to the intermediate network 1340 (e.g., via edge router(s) 1314 that connect the network 1350 to Internet transit providers). The provider data center 1300 network may also route packets between resources in data center 1300, for example from a VM 1324 on a host 1320 in data center 1300 to other VMs 1324 on the same host or on other hosts 1320 in data center 1300.

A service provider that provides data center 1300 may also provide additional data center(s) 1360 that include hardware virtualization technology similar to data center 1300 and that may also be connected to intermediate network 1340. Packets may be forwarded from data center 1300 to other data centers 1360, for example from a VM 1324 on a host 1320 in data center 1300 to another VM on another host in another, similar data center 1360, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1318, as virtualized resources to clients of a network provider in a similar manner.

Figure 14:
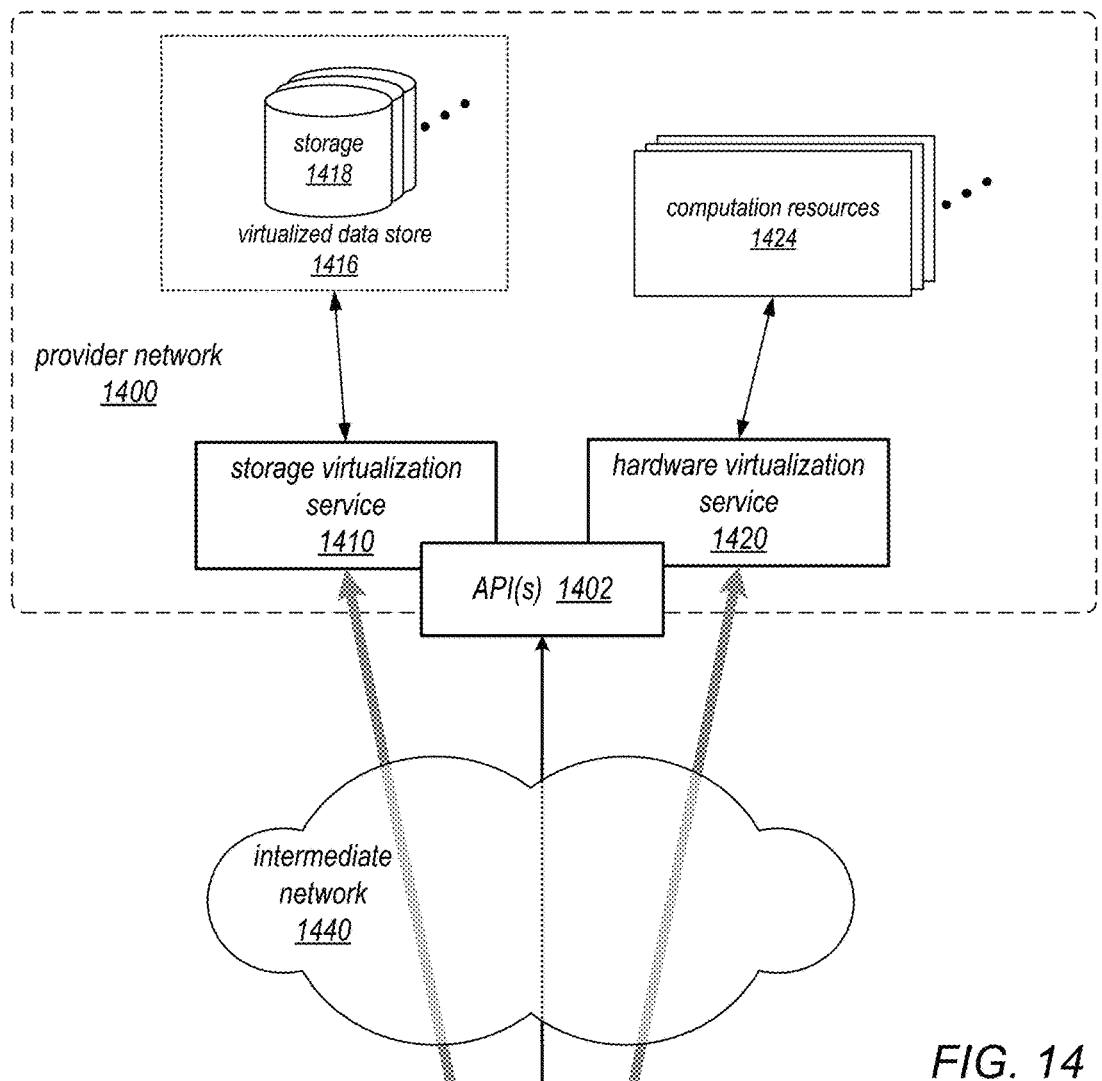
FIG. 14 is a block diagram of an example provider network that provides a storage virtualization service and a hardware virtualization service to clients, according to at least some embodiments.
Figure 14:
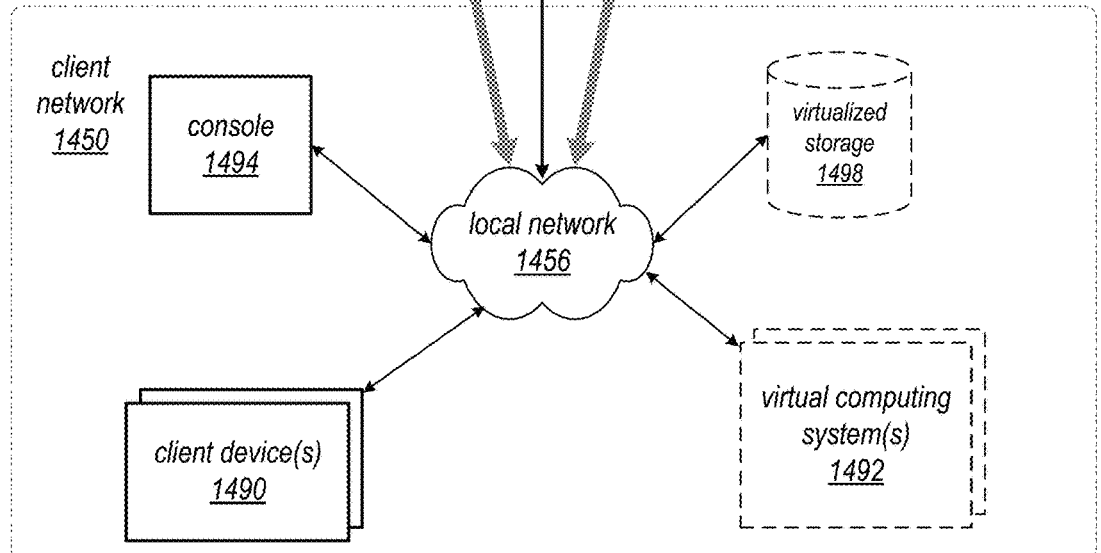

FIG. 14 is a block diagram of an example provider network that provides a storage virtualization service and a hardware virtualization service to clients, according to at least some embodiments. Hardware virtualization service 1420 provides multiple computation resources 1424 (e.g., VMs) to clients. The computation resources 1424 may, for example, be rented or leased to clients of the provider network 1400 (e.g., to a client that implements client network 1450). Each computation resource 1424 may be provided with one or more private IP addresses. Provider network 1400 may be configured to route packets from the private IP addresses of the computation resources 1424 to public Internet destinations, and from public Internet sources to the computation resources 1424.

Provider network 1400 may provide a client network 1450, for example coupled to intermediate network 1440 via local network 1456, the ability to implement virtual computing systems 1492 via hardware virtualization service 1420 coupled to intermediate network 1440 and to provider network 1400. In some embodiments, hardware virtualization service 1420 may provide one or more APIs 1402, for example a web services interface, via which a client network 1450 may access functionality provided by the hardware virtualization service 1420, for example via a console 1494. In at least some embodiments, at the provider network 1400, each virtual computing system 1492 at client network 1450 may correspond to a computation resource 1424 that is leased, rented, or otherwise provided to client network 1450.

From an instance of a virtual computing system 1492 and/or another client device 1490 or console 1494, the client may access the functionality of storage virtualization service 1410, for example via one or more APIs 1402, to access data from and store data to a virtualized data store 1416 provided by the provider network 1400. In some embodiments, a virtualized data store gateway (not shown) may be provided at the client network 1450 that may locally cache at least some data, for example frequently accessed or critical data, and that may communicate with virtualized data store service 1410 via one or more communications channels to upload new or modified data from a local cache so that the primary store of data (virtualized data store 1416) is maintained. In at least some embodiments, a user, via a virtual computing system 1492 and/or on another client device 1490, may mount and access virtualized data store 1416 volumes, which appear to the user as local virtualized storage 1498. Note that, in various embodiments, storage 1418 of virtualized data store 1416 may include object storage, block-based storage, and/or volume-based storage, as described herein.

While not shown in FIG. 14, the virtualization service(s) may also be accessed from resource instances within the provider network 1400 via API(s) 1402. For example, a client, appliance service provider, or other entity may access a virtualization service from within a respective private network on the provider network 1400 via an API 1402 to request allocation of one or more resource instances within the private network or within another private network.

FIG. 15 illustrates an example provider network that provides private networks on the provider network to at least some clients, according to at least some embodiments. A client's virtualized private network 1560 on a provider network 1500, for example, enables a client to connect their existing infrastructure (e.g., devices 1552) on client network 1550 to a set of logically isolated resource instances (e.g., VMs 1524A and 1524B and storage 1518A and 1518B), and to extend management capabilities such as security services, firewalls, and intrusion detection systems to include their resource instances.

A client's virtualized private network 1560 may be connected to a client network 1550 via a private communications channel 1542. A private communications channel 1542 may, for example, be a tunnel implemented according to a network tunneling technology or some other peering connection over an intermediate network 1540. The intermediate network may, for example, be a shared network or a public network such as the Internet. Alternatively, a private communications channel 1542 may be implemented over a direct, dedicated connection between virtualized private network 1560 and client network 1550.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtualized private network 1560 for a client on provider network 1500, one or more resource instances (e.g., VMs 1524A and 1524B and storage 1518A and 1518B) may be allocated to the virtualized private network 1560. Note that other resource instances (e.g., storage 1518C and VMs 1524C) may remain available on the provider network 1500 for other client usage. A range of public IP addresses may also be allocated to the virtualized private network 1560. In addition, one or more networking devices (routers, switches, etc.) of the provider network 1500 may be allocated to the virtualized private network 1560. A private communications channel 1542 may be established between a private gateway 1562 at virtualized private network 1560 and a gateway 1556 at client network 1550.

In at least some embodiments, in addition to, or instead of, a private gateway 1562, virtualized private network 1560 may include a public gateway 1564 that enables resources within virtualized private network 1560 to communicate directly with entities (e.g., network entity 1544) via intermediate network 1540, and vice versa, instead of or in addition to via private communications channel 1542.

Virtualized private network 1560 may be, but is not necessarily, subdivided into two or more subnets 1570. For example, in implementations that include both a private gateway 1562 and a public gateway 1564, the private network may be subdivided into a subnet 1570A that includes resources (VMs 1524A and storage 1518A, in this example) reachable through private gateway 1562, and a subnet 1570B that includes resources (VMs 1524B and storage 1518B, in this example) reachable through public gateway 1564.

The client may assign particular client public IP addresses to particular resource instances in virtualized private network 1560. A network entity 1544 on intermediate network 1540 may then send traffic to a public IP address published by the client; the traffic is routed, by the provider network 1500, to the associated resource instance. Return traffic from the resource instance is routed, by the provider network 1500, back to the network entity 1544 over intermediate network 1540. Note that routing traffic between a resource instance and a network entity 1544 may require network address translation to translate between the public IP address and the private IP address of the resource instance.

At least some embodiments may allow a client to remap public IP addresses in a client's virtualized private network 1560 as illustrated in FIG. 15 to devices on the client's external network 1550. When a packet is received (e.g., from network entity 1544), the network 1500 may determine that the destination IP address indicated by the packet has been remapped to an endpoint on external network 1550 and handle routing of the packet to the respective endpoint, either via private communications channel 1542 or via the intermediate network 1540. Response traffic may be routed from the endpoint to the network entity 1544 through the provider network 1500, or alternatively may be directly routed to the network entity 1544 by the client network 1550. From the perspective of the network entity 1544, it appears as if the network entity 1544 is communicating with the public IP address of the client on the provider network 1500. However, the network entity 1544 has actually communicated with the endpoint on client network 1550.

While FIG. 15 shows network entity 1544 on intermediate network 1540 and external to provider network 1500, a network entity may be an entity on provider network 1500. For example, one of the resource instances provided by provider network 1500 may be a network entity that sends traffic to a public IP address published by the client.

Illustrative System

Figure 16:
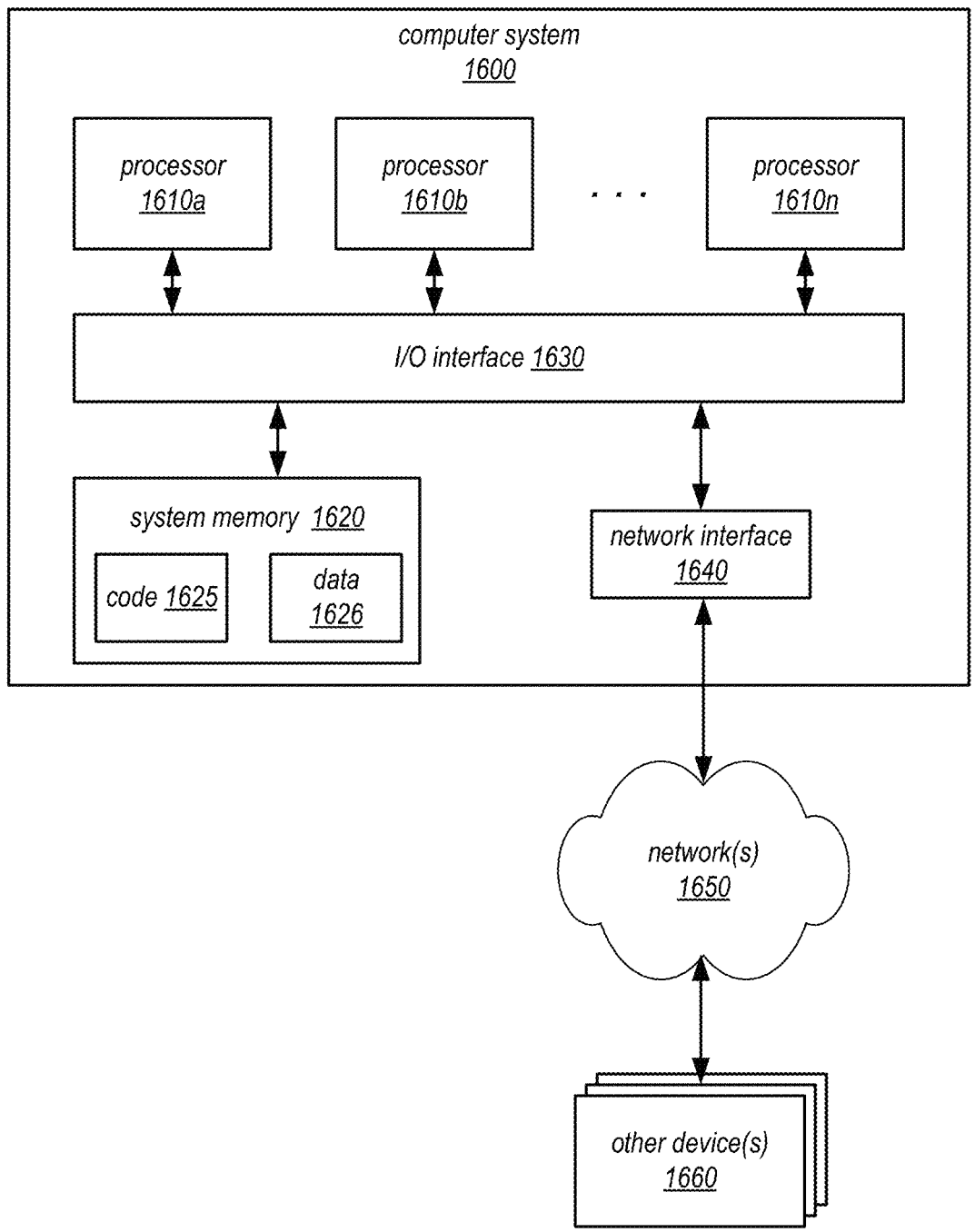
FIG. 16 is a block diagram illustrating an example computer system that may be used in some embodiments.

In at least some embodiments, a computing environment that implements a portion or all of the methods and apparatus described herein may include a general-purpose computer system that includes or is configured to access one or more computer-accessible media, such as computer system 1600 illustrated in FIG. 16. For example, in various embodiments, computer system 1600 may represent a master node or worker node of a distributed computation system (e.g., a MapReduce cluster), a node of an object storage service, block-based storage service, or volume-based storage service, a computing node on a service provider system that implements an identity and access manager, a client computing system, or any other type of computer system that may be employed to implement the methods and apparatus described herein. In the illustrated embodiment, computer system 1600 includes one or more processors 1610 coupled to a system memory 1620 via an input/output (I/O) interface 1630. Computer system 1600 further includes a network interface 1640 coupled to I/O interface 1630.

In various embodiments, computer system 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA.

System memory 1620 may be configured to store instructions and data accessible by processor(s) 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for the methods and apparatus described herein, are shown stored within system memory 1620 as code 1625 and data 1626. For example, at various times, data 1626 in system memory 1620 may include one or more of a data set (or portion thereof) that is to processed by a HPC application or computation (e.g., a MapReduce application or MPI application), output data that is produced by such an application, key pairs, hostfiles, rankfiles, or configuration or operating parameters for a MapReduce job or an MPI job, or any other information usable when executing such applications. In another example, at various times, code 1625 in system memory 1620 may include program instructions that are executable to implement a MapReduce application or MPI application (or any portion thereof), an operating system or virtual machine monitor, library or utility functions, an API or service interface, or any other program instructions that are executable to perform the methods described herein.

In one embodiment, I/O interface 1630 may be configured to coordinate I/O traffic between processor 1610, system memory 1620, and any peripheral devices in the device, including network interface 1640 or other peripheral interfaces. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices 1660 attached to a network or networks 1650, such as other computer systems (e.g., computer systems similar to computer system 1600 or computer systems that include more, fewer, or different components than computer system 1600) or devices as illustrated and described in FIGS. 1 through 15, for example. For example, in some embodiments, computer system 1600 may represent a node of a cluster-based DCS (e.g., a MapReduce cluster), and network interface 1640 may be configured to allow data to be exchanged between computer system 1600 and devices that implement an object data storage service, block-based storage service, or a volume-based storage service. In various embodiments, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks such as Fibre Channel SANs, or via any other suitable type of network and/or protocol.

In some embodiments, system memory 1620 may be one embodiment of a computer-accessible medium configured to store program instructions and data as described above for FIGS. 1 through 15 for implementing embodiments of methods and apparatus as described herein. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1600 via I/O interface 1630. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1600 as system memory 1620 or another type of memory. Further, a computer-accessible medium may include transmission media or signals such as electrical, electromagnetic, or digital signals, conveyed via a communication medium such as a network and/or a wireless link, such as may be implemented via network interface 1640.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A distributed computing system, comprising:
a plurality of compute nodes, each compute node comprising at least one processor and a memory, wherein the distributed computing system implements a distributed computing service accessible via a service interface, configured to:
provide a plurality of clusters of respective compute nodes to respective customers;
receive a request to create a first cluster of compute nodes on behalf of a customer via the service interface, and in response to the request:
configure two or more of the plurality of compute nodes as the first cluster of compute nodes;
implement a mechanism to isolate the first cluster of compute nodes from network traffic from compute nodes of other clusters of compute nodes in the distributed computing system;
implement a mechanism to restrict permission to access data, metadata, or resources that are associated with the first cluster of compute nodes by compute nodes of the other clusters of compute nodes in the distributed computing system; and
implement a mechanism to restrict access to one or more application programming interfaces of the distributed computing service by the compute nodes of the first cluster, wherein the one or more application programming interfaces are accessible by the compute nodes of the first cluster to discover compute nodes and resources of the other clusters, and the restriction of access disallows the discovery by the compute nodes of the first cluster.

2. The distributed computing system of claim 1,
wherein to isolate the first cluster of compute nodes from network traffic from compute nodes of the other clusters of compute nodes in the distributed computing system, the distributed computing service is configured to configure the two or more compute nodes as a first cluster of compute nodes within a first virtual private cloud; and
wherein the other clusters of compute nodes are configured as other virtual private clouds.

3. The distributed computing system of claim 1,
wherein the distributed computing system further comprises an identity and access manager;
wherein to restrict access to the one or more application programming interfaces of the distributed computing service by the compute nodes of the first cluster, the distributed computing service is configured to create an identity and access management profile role for the compute nodes of the first cluster in the identity and access manager that defines which of the application programming interfaces of the distributed computing service the compute nodes of the first cluster are permitted to perform.

4. The distributed computing system of claim 1,
wherein to restrict permission to access data, metadata, or resources that are associated with the first cluster of compute nodes by compute nodes of the other clusters of compute nodes in the distributed computing system, the distributed computing service is configured to assign a storage system prefix to the first cluster of compute nodes;
wherein the distributed computing system further comprises an object data store that stores data or metadata for the first cluster of compute nodes in association with the storage system prefix assigned to the first cluster of compute nodes;
wherein the data or metadata for the first cluster of compute nodes stored in association with the storage system prefix assigned to the first cluster of compute nodes is retrievable by the first cluster of compute nodes; and
wherein the data or metadata for the first cluster of compute nodes stored in association with the storage system prefix assigned to the first cluster of compute nodes is not retrievable by the other clusters of compute nodes.

5. The distributed computing system of claim 1, wherein each of the two or more compute nodes configured as the first cluster of compute nodes comprises one or more virtualized resource instances.

6. The distributed computing system of claim 5,
wherein the distributed computing system further comprises a plurality of block-based storage devices that store data or metadata in a plurality of storage volumes outside of the one or more virtualized resource instances;

wherein to restrict permission to access data, metadata, or resources that are associated with the first cluster of compute nodes by compute nodes of the other clusters of compute nodes in the distributed computing system, the distributed computing service is configured to:
create an instance metadata tag for the first cluster of compute nodes;
assign the instance metadata tag to the one or more virtualized resource instance;
assign the instance metadata tag to one or more of the plurality of storage volumes; and
store data or metadata for the first cluster of compute nodes on the one or more storage volumes;
wherein the data or metadata for the first cluster of compute nodes stored on the one or more storage volumes is retrievable by the first cluster of compute nodes; and
wherein the data or metadata for the first cluster of compute nodes stored on the one or more storage volumes is not retrievable by the other clusters of compute nodes.

7. A method, comprising:
performing, by one or more computers:
creating a cluster of compute nodes, wherein creating the cluster comprises provisioning a collection of virtualized resource instances that are allocated by a distributed computing service provider to a given customer account;
creating a profile role for the compute nodes of the cluster that defines (a) which data on storage resources outside the cluster that the compute nodes are permitted to access and (b) which of a plurality of application programming interfaces exposed by the distributed computing service provider the compute nodes are permitted to perform;
creating another cluster of other compute nodes, wherein creating the other cluster comprises provisioning another collection of virtualized resource instances that are allocated by the distributed computing service provider to the given customer account;
creating another profile role for the other compute nodes of the other cluster that defines (a) which data on storage resources outside the other cluster that the other compute nodes are permitted to access and (b) which of the plurality of application programming interfaces the other compute nodes are permitted to perform;
initiating execution of an application on the cluster of compute nodes that accesses, in accordance with the profile role, data or metadata stored in a data store implemented on storage resources that are allocated by the distributed computing service provider to the given customer account; and
initiating execution of another application on the other cluster of compute nodes;
wherein, in accordance with the other profile role, the other application executing on the other cluster is not permitted to invoke one or more of the application programming interfaces to discover the compute nodes of the cluster and the data or metadata stored in the data store is not accessible by the other application.

8. The method of claim 7,
wherein the method further comprises, prior to creating the cluster, receiving a request from a client to create the cluster under the given customer account;
wherein said creating a cluster is performed in response to receiving the request from the client;
wherein the method further comprises, prior to creating the other cluster, receiving a request from another client to create the other cluster under the given customer account; and
wherein said creating another cluster is performed in response to receiving the request from the other client.

9. The method of claim 7, further comprising storing the profile role and the other profile role in creating an identity and access management system supporting the distributed computing service.

10. The method of claim 7, further comprising:
assigning a storage system prefix to the cluster of compute nodes;
storing data or metadata for the cluster of compute nodes in association with the storage system prefix assigned to the cluster of compute nodes; and
retrieving, by a virtualized resource instance in the collection of virtualized resource instances, the stored data or metadata for the cluster;
wherein the profile role for the cluster grants permission for the virtualized resource instance in the collection of virtualized resource instances to perform said retrieving of the data or metadata stored in association with the storage system prefix.

11. The method of claim 7, further comprising:
creating an instance metadata tag for the cluster; and
assigning the instance metadata tag to each of the virtualized resource instances in the collection of virtualized resource instances.

12. The method of claim 7, further comprising:
assigning the instance metadata tag to a storage volume that is outside the collection of virtualized resource instances; and
storing data or metadata for the cluster on the storage volume;
wherein the data or metadata for the cluster stored on the storage volume is retrievable by virtualized resource instances in the collection of virtualized resource instances; and
wherein the data or metadata for the cluster stored on the storage volume is not retrievable by virtualized resource instances in the other collection of virtualized resource instances.

13. The method of claim 7, wherein the instance metadata tag comprises a customer-specified tag that is unique within instance metadata tags maintained by the distributed computing service provider.

14. The method of claim 13, wherein the instance metadata tag comprises a cluster-specific tag that is generated by the distributed computing service provider.

15. The method of claim 7, wherein at least one of creating the cluster or creating the other cluster comprises configuring a collection of virtualized resource instances as a cluster of compute nodes according to a MapReduce distributed computing framework.

16. A non-transitory computer-accessible storage medium storing program instructions that when executed on one or more computers cause the one or more computers to implement a distributed computing service and cause the distributed computing service to:
receive a request to create a first cluster of compute nodes associated with a given service customer account and to assign a given instance metadata tag to the cluster;
provision a plurality of virtualized resource instances for the first cluster of compute nodes;

assign the given instance metadata tag to the plurality of virtualized resource instances of the first cluster;
restrict access to one or more application programming interfaces provided by the distributed computing service by the virtualized resource instances of the first cluster, wherein restriction of access disallows the virtualized resource instances of the first cluster from discovering virtualized resource instances of other clusters associated with the given customer account;
create the first cluster of compute nodes, wherein the first cluster of compute nodes comprises the plurality of virtualized resource instances;
receive a request to create a second cluster of compute nodes associated with the given service customer account and to assign a different instance metadata tag to the second cluster;
provision a second plurality of virtualized resource instances for the second cluster of compute nodes;
assign the different instance metadata tag to the second plurality of virtualized resource instances of the second cluster;
restrict access to the one or more application programming interfaces by the virtualized resource instances of the second cluster, wherein restriction of access disallows the virtualized resource instances of the second cluster from discovering virtualized resource instances of other clusters associated with the given customer account including the first cluster;
create the second cluster of compute nodes, wherein the second cluster of compute nodes comprises the second plurality of virtualized resource instances;
assign the given instance metadata tag to a storage volume on which data or metadata that will be accessed by a first application is stored, wherein only instances that are assigned the given instance metadata tag are allowed to access the data or metadata stored on the storage volume;
execute the first application on the first cluster of compute nodes and a second application on the second cluster substantially in parallel; and
access, by the first application during execution of the first application on the first cluster with the given instance metadata tag, the stored data or metadata;
wherein the first application and the second application execute in isolation with respect to each other; and
wherein the second application executing on the second cluster with the different instance metadata tag does not have permission to access the stored data or metadata.

17. The non-transitory computer-accessible storage medium of claim 16, wherein to create the first cluster of compute nodes, the program instructions when executed on the one or more computers cause the distributed computing service to configure the plurality of virtualized resource instances as a cluster of compute nodes according to a MapReduce distributed computing framework.

18. The non-transitory computer-accessible storage medium of claim 16, wherein the program instructions when executed on the one or more computers cause the distributed computing service to:

receive a storage system prefix for the first cluster;
assign the storage system prefix to the plurality of virtualized resource instances, wherein assigning the storage system prefix to the plurality of virtualized resource instances allows the plurality of virtualized resource instances to access data or metadata that was stored in association with the storage system prefix;
receive a second storage system prefix for the second cluster; and
assign the second storage system prefix to the second plurality of virtualized resource instances, wherein assigning the second storage system prefix to the second plurality of virtualized resource instances allows the second plurality of virtualized resource instances to access data or metadata that was stored in association with the second storage system prefix;
wherein the plurality of virtualized resource instances do not have permission to access data or metadata that was stored in association with the second storage system prefix; and
wherein the second plurality of virtualized resource instances do not have permission to access data or metadata that was stored in association with the storage system prefix.

19. The non-transitory computer-accessible storage medium of claim 16, wherein to execute the first application and the second application in isolation with respect to each other, the program instructions when executed on the one or more computers cause the distributed computing service to implement two or more of:
isolating the first cluster from network traffic from the second cluster;
isolating the second cluster from network traffic from the first cluster;
restricting access by the second cluster to data, metadata, or resources that are within the first cluster or that are associated with the first cluster; and
restricting access by the first cluster to data, metadata, or resources that are within the second cluster or that are associated with the second cluster.

20. The non-transitory computer-accessible storage medium of claim 16,
wherein to provision the plurality of virtualized resource instances as the first cluster of compute nodes, the program instructions when executed on the one or more computers cause the distributed computing service to provision the plurality of virtualized resource instances as the first cluster of compute nodes within a virtual private cloud; and
wherein to provision the second plurality of virtualized resource instances as the second cluster of compute nodes, the program instructions when executed on the one or more computers cause the distributed computing service to provision the second plurality of virtualized resource instances as the second cluster of compute nodes within a different virtual private cloud.

* * * * *